United States Patent
Fukuda

(10) Patent No.: US 10,062,067 B2
(45) Date of Patent: Aug. 28, 2018

(54) OBJECT RECOGNITION DEVICE, CHECKOUT TERMINAL, AND METHOD FOR PROCESSING INFORMATION

(71) Applicant: TOSHIBA TEC KABUSHIKI KAISHA, Tokyo (JP)

(72) Inventor: Masatsugu Fukuda, Kannami Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 440 days.

(21) Appl. No.: 14/590,676

(22) Filed: Jan. 6, 2015

(65) Prior Publication Data
US 2015/0193759 A1 Jul. 9, 2015

(30) Foreign Application Priority Data
Jan. 7, 2014 (JP) .................. 2014-001181

(51) Int. Cl.
*G06Q 20/20* (2012.01)
*G07G 1/00* (2006.01)
*G07G 1/12* (2006.01)
*G06K 9/32* (2006.01)
*G07C 1/00* (2006.01)

(52) U.S. Cl.
CPC ......... *G06Q 20/208* (2013.01); *G06K 9/3241* (2013.01); *G07C 1/00* (2013.01); *G07G 1/0009* (2013.01); *G07G 1/0036* (2013.01); *G07G 1/12* (2013.01)

(58) Field of Classification Search
CPC .............. G06K 9/4652; G06K 9/6202; G06K 2209/17; G06Q 30/0641; G06Q 30/0643
See application file for complete search history.

(56) References Cited

U.S. PATENT DOCUMENTS

| | | | |
|---|---|---|---|
| 2009/0259466 A1* | 10/2009 | Stubley | G10L 15/08 704/240 |
| 2013/0141585 A1* | 6/2013 | Naito | G06Q 20/208 348/150 |
| 2013/0304595 A1* | 11/2013 | Goncalves | G06Q 20/203 705/22 |
| 2015/0234881 A1* | 8/2015 | Hirata | G06F 17/30348 707/609 |

FOREIGN PATENT DOCUMENTS

JP    2003-173369 A    6/2003

* cited by examiner

*Primary Examiner* — Florian M Zeender
*Assistant Examiner* — Joseph M Mutschler
(74) *Attorney, Agent, or Firm* — Patterson & Sheridan, LLP

(57) ABSTRACT

An object recognition device includes an operation unit configured to receive a user input about an item, a storage unit that stores image data of the item, an imaging unit configured to acquire an image of the item and generate image data therefrom, and a control unit configured to compare the generated image data with the stored image data, and cause information about updating the stored image data to be presented to a user, based on a comparison result.

12 Claims, 21 Drawing Sheets

FIG. 3

| MERCHANDISE ID | MERCHANDISE CLASSIFICATION | MERCHANDISE NAME | BREED OF MERCHANDISE | UNIT PRICE | ILLUSTRATION IMAGE | FEATURE VALUE |
|---|---|---|---|---|---|---|
| XXXXXXXX | VEGETABLE | CARROT | | 100 YEN | | XXXXXXXX |
| ...... | ...... | ...... | ...... | ...... | ...... | ...... |
| XXXXXXXX | FRUIT | APPLE | FUJI | 100 YEN | | XXXXXXXX |
| XXXXXXXX | FRUIT | APPLE | JONAH GOLD | 150 YEN | | XXXXXXXX |
| XXXXXXXX | FRUIT | APPLE | TSUGARU | 200 YEN | | XXXXXXXX |
| XXXXXXXX | FRUIT | APPLE | JONATHAN | 250 YEN | | XXXXXXXX |

F1

OBJECT RECOGNITION DEVICE, CHECKOUT TERMINAL, AND METHOD FOR PROCESSING INFORMATION

CROSS-REFERENCE TO RELATED APPLICATION

This application is based upon and claims the benefit of priority from Japanese Patent Application No. 2014-001181, filed Jan. 7, 2014, the entire contents of which are incorporated herein by reference.

FIELD

Embodiments described herein relate generally to an object recognition device, a checkout terminal, and a method for processing information.

BACKGROUND

In the related art, object recognition technology is used to identify a target object according to similarity between feature values of the target object extracted from image data acquired by an image sensor and collation data (feature values) of various known items. Such an object recognition technology can be applied to a checkout system of a store to identify items to be purchased such as fruits and vegetables that may not have code symbols, and register sales of the identified items.

In a file used for the object recognition, collation data (feature value) of various known items are registered in advance. However, when the collation data (feature values) registered in the file is improper, similarity between the target item and the corresponding registered item may be low, and the identification of the target item may be not carried out properly.

DESCRIPTION OF THE DRAWINGS

FIG. 3 illustrates data structure of a PLU file stored in the POS terminal.

DETAILED DESCRIPTION

Embodiments provide an information processing device, a store system, and a program capable of reporting necessity of additional registration of collation data (feature value) for object recognition.

In general, according to one embodiment, an object recognition device includes an operation unit configured to receive a user input about an item, a storage unit that stores image data of the item, an imaging unit configured to acquire an image of the item and generate image data therefrom, and a control unit configured to compare the generated image data with the stored image data, and cause information about updating the stored image data to be presented to a user, based on a comparison result.

Hereinafter, an information processing device, a store system, and a program according to the embodiment will be described with reference to the drawings, using a checkout system as an example. The store system is, for example, a checkout system (POS system) that includes a POS terminal registering one or more items related to a transaction and settling the transaction. The embodiment is directed to a checkout system located in a store such as a supermarket.

Figure 1:
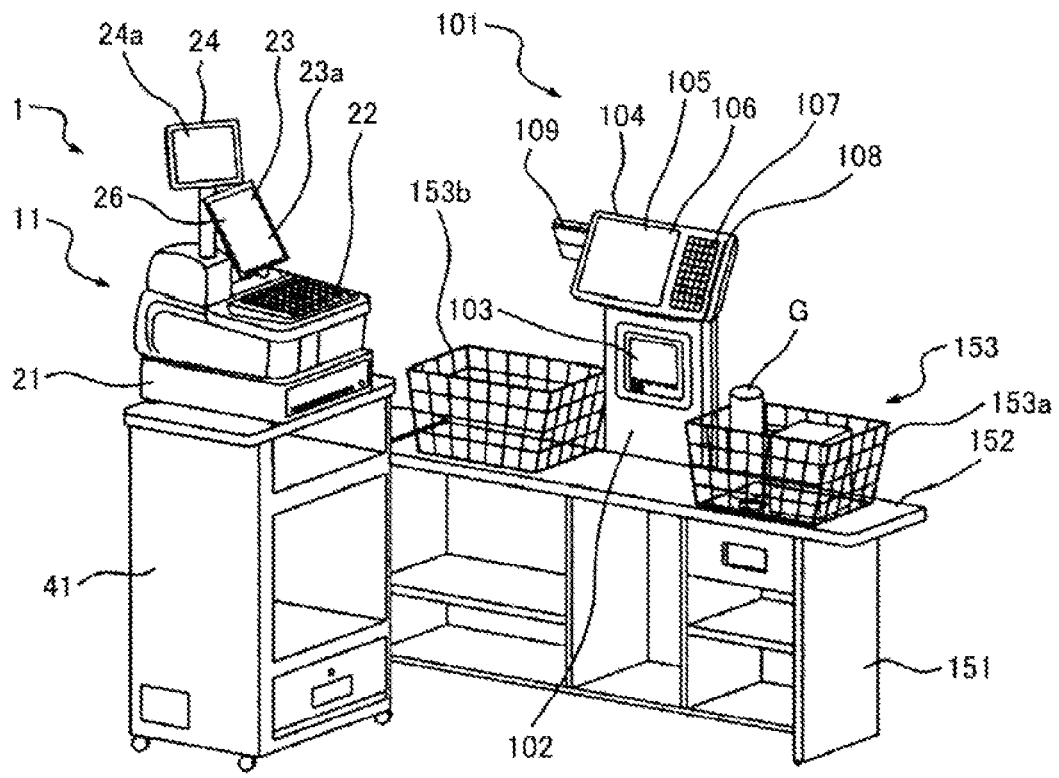
FIG. 1 illustrates an example of a checkout system according to an embodiment.

FIG. 1 illustrates a checkout system 1 according to the embodiment. As shown in FIG. 1, the checkout system 1 includes a merchandise recognizing device 101 that reads information regarding an item to be purchased and a POS terminal 11 that registers the item and settles the purchase transaction. Hereinafter, an example in which the POS terminal 11 is applied as the information processing device according to the embodiment will be described.

The POS terminal 11 is placed on the top surface of a drawer 21 on a checkout table 41. An opening operation of the drawer 21 is controlled by the POS terminal 11. A keyboard 22 to be operated by an operator (casher) is disposed on the top surface of the POS terminal 11. A display device 23 that displays information toward the operator is disposed on the back side of the keyboard 22 when viewed from the operator operating the keyboard 22. The display device 23 displays information on a display surface 23a. A touch panel 26 is laminated on the display surface 23a. A customer display device 24 is rotatably erected on the back side of the display device 23. The customer display device 24 displays information on a display surface 24a. The display surface 24a of the customer display device 24 shown in FIG. 1 faces the operator. However, the position of the customer display device 24 is adjusted to display information toward a customer.

A counter table 151 with a horizontally long table shape is disposed to form an L-shape with the checkout table 41 on which the POS terminal 11 is placed. A load receiving surface 152 is formed on the top surface of the counter table 151. A shopping basket 153 containing item A is placed on the load receiving surface 152. The shopping baskets 153 includes a first shopping basket 153a brought by a customer and a second shopping basket 153b placed at a position such that the merchandise recognizing device 101 is interposed between the first shopping basket 153a and the second shopping basket 153b. The shopping baskets 153 are not limited to the one having a so-called basket shape, but may be trays or the like. The shopping basket 153 (second shopping basket 153b) is not limited to the one having a so-called basket shape, but may have a box-like shape, a bag-like shape, or the like.

The merchandise recognizing device 101 that is connected to transmit and receive data to and from the POS terminal 11 is installed on the load receiving surface 152 of the counter table 151. The merchandise recognizing device 101 includes a housing 102 with a thin rectangular shape. A reading window 103 is disposed on the front surface of the housing 102. A display and operation unit 104 is disposed on the top portion of the housing 102. A display device 106 serving as a display unit has the touch panel 105 laminated thereon and is disposed in the display and operation unit 104. A keyboard 107 is disposed on the right side of the display device 106. A card reading groove 108 of a card reader (not shown) is installed on the right side of the keyboard 107. A customer display device 109 supplying information to a customer is disposed on a back side of the display and operation unit 104 when viewed from the operator.

Figure 2:
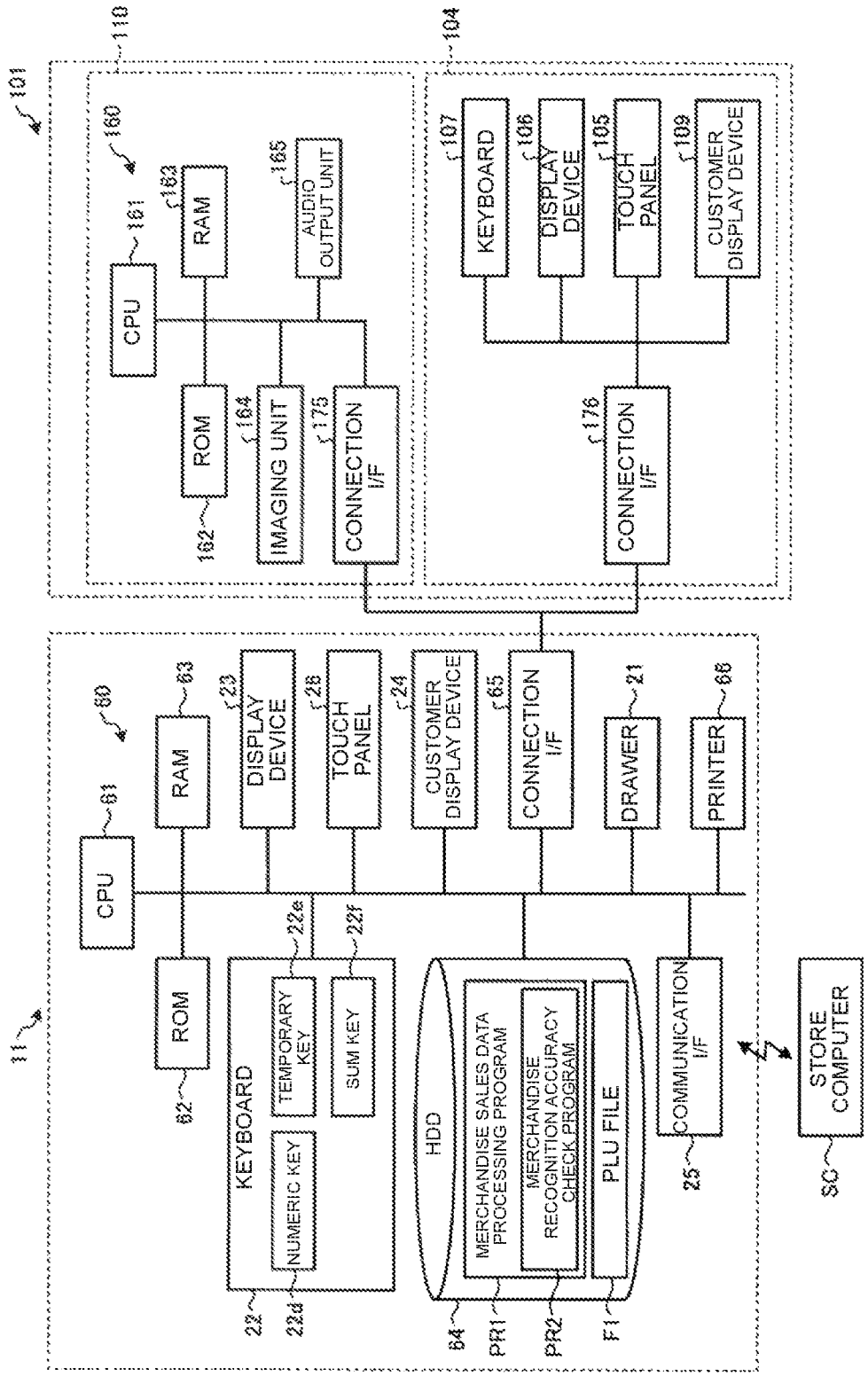
FIG. 2 illustrates hardware configurations of a POS terminal and a merchandise reading device of the checkout system.

The merchandise recognizing device 101 includes a merchandise scanning unit 110 (see FIG. 2). An imaging unit 164 (see FIG. 2) of the merchandise scanning unit 110 is disposed behind the reading window 103.

The item A for a transaction is contained in the first shopping basket 153a brought by the customer. The item A in the first shopping basket 153a is moved into the second shopping basket 153b by the operator operating the merchandise recognizing device 101. During the process, the item A is held near the reading window 103 of the merchandise recognizing device 101. At this time, the imaging unit 164 (see FIG. 2) disposed inside the reading window 103 acquires an image of the item A.

The merchandise recognizing device 101 displays a screen on the display and operation unit 104, on which one or more items registered in a PLU file F1 (see FIG. 3) are displayed such that a user can select one that corresponds to the item A, and notifies the POS terminal 11 of a merchandise ID of the selected item. Based on the merchandise ID notified of by the merchandise recognizing device 101, the POS terminal 11 registers sale of the item A by recording information regarding merchandise classification, a merchandise name, a unit price, and the like of the item corresponding to the merchandise ID on a sales master file (not shown) or the like.

FIG. 2 illustrates hardware configurations of the POS terminal 11 and the merchandise recognizing device 101. The POS terminal 11 includes a microcomputer 60 serving as an information processing unit. The microcomputer 60 has a central processing unit (CPU) 61 that performs various arithmetic processes to control each unit, and a read-only memory (ROM) 62 and a random access memory (RAM) 63 that are bus-connected to the central processing unit (CPU) 61.

The drawer 21, the keyboard 22, the display device 23, the touch panel 26, and the customer display device 24 described above are all connected to the CPU 61 of the POS terminal 11 via various input/output circuits (none of which are shown). These components are controlled by the CPU 61.

The keyboard 22 includes numeric keys 22d in which numbers such as "1," "2," "3," etc and a multiplication operator of "x" are marked on the upper surfaces, a temporary sum key 22e, and a sum key 22f.

A hard disk drive (HDD) 64 is connected to the CPU 61 of the POS terminal 11. The HDD 64 stores programs and various files. Some or all of the programs and the various files stored in the HDD 64 are copied to the RAM 63 and are executed by the CPU 61 when the POS terminal 11 is activated. Examples of the program stored in the HDD 64 are a merchandise sales data processing program PR1 and a merchandise recognition accuracy check program PR2. An example of the file stored in the HDD 64 is a PLU file F1, which is transmitted from a store computer SC.

The PLU file F1 is a merchandise file having information regarding sales registration of the items for sale for each of the items. In the following description, the PLU file F1 is used as a dictionary. However, the dictionary may be a file different from the PLU file F1. The dictionary stores collation data (feature value) used to identify the item A extracted from imaged image data, with respect to a plurality of items for sale. The collation data (feature value) stored in the dictionary is associated with information (identification information) stored in the PLU file F1 when the dictionary is a file different from the PLU file F1. The feature value is a value obtained by parameterizing characteristics of the outer appearance of each of the items for sale, such as a standard shape, a surface hue, a pattern, an unevenness of the item.

FIG. 3 illustrates data structure of the PLU file F1. As shown in FIG. 3, the PLU file F1 is a file that includes information regarding each of items for sale, such as a merchandise ID which is identification information allocated uniquely to each of the items, merchandise classification to which the item belongs, a merchandise name, a breed, and a unit price; an illustration image indicating the item; and a feature value such as a hue or surface unevenness obtained from the image of the item, as merchandise information regarding the item. The feature value is collation data used to determine similarity (described below). The PLU file F1 is configured to be readable by the merchandise recognizing device 101 via a connection interface 65.

Referring back to FIG. 2, a communication interface 25 executing data communication with the store computer SC is connected to the CPU 61 of the POS terminal 11 via an input/output circuit (not shown). The store computer SC is located in a backyard or the like of a store. An HDD (not shown) of the store computer SC stores the PLU file F1 to be transmitted to the POS terminal 11.

A connection interface 65 enabling data to be transmitted to and received from the merchandise recognizing device 101 is also connected to the CPU 61 of the POS terminal 11. The merchandise recognizing device 101 is connected to the connection interface 65. A printer 66 that prints receipts or the like is connected to the CPU 61 of the POS terminal 11. The POS terminal 11 prints transaction content of a transaction on receipts under the control of the CPU 61.

The merchandise recognizing device 101 also includes a microcomputer 160. The microcomputer 160 includes a CPU 161, and a ROM 162 and a RAM 163 that are bus-connected to the CPU 161. The ROM 162 stores programs executed by the CPU 161. An imaging unit 164 and an audio output unit 165 are connected to the CPU 161 via various input/output circuits (not shown). Operations of the imaging unit 164 and the audio output unit 165 are controlled by the CPU 161. The display and operation unit 104 is connected to the merchandise scanning unit 110 and the POS terminal 11 via a connection interface 176. An operation of the display and operation unit 104 is controlled by the CPU 161 of the merchandise scanning unit 110 and the CPU 61 of the POS terminal 11.

The imaging unit 164 is, for example, a color CCD image sensor or a color CMOS image sensor and is an imaging section that performs imaging through the reading window 103 under the control of the CPU 161. For example, the imaging unit 164 acquires a video image at 30 fps (Frame Per Second). Frame images (acquired images) acquired at a predetermined frame rate by the imaging unit 164 are stored in the RAM 163.

The audio output unit 165 is, for example, an audio circuit or a speaker that generates a preset warning sound or the like. The audio output unit 165 generates the warning sound or an audio under the control of the CPU 161.

A connection interface 175 that is connected to the connection interface 65 of the POS terminal 11 and enables data to be transmitted to and received from the POS terminal 11 is connected to the CPU 161. The CPU 161 transmits and receives data to and from the display and operation unit 104 via the connection interface 175.

Next, a functions of the CPU 61 achieved by executing programs (the merchandise sales data processing program PR1 and the merchandise recognition accuracy check program PR2) will be described.

Figure 4:
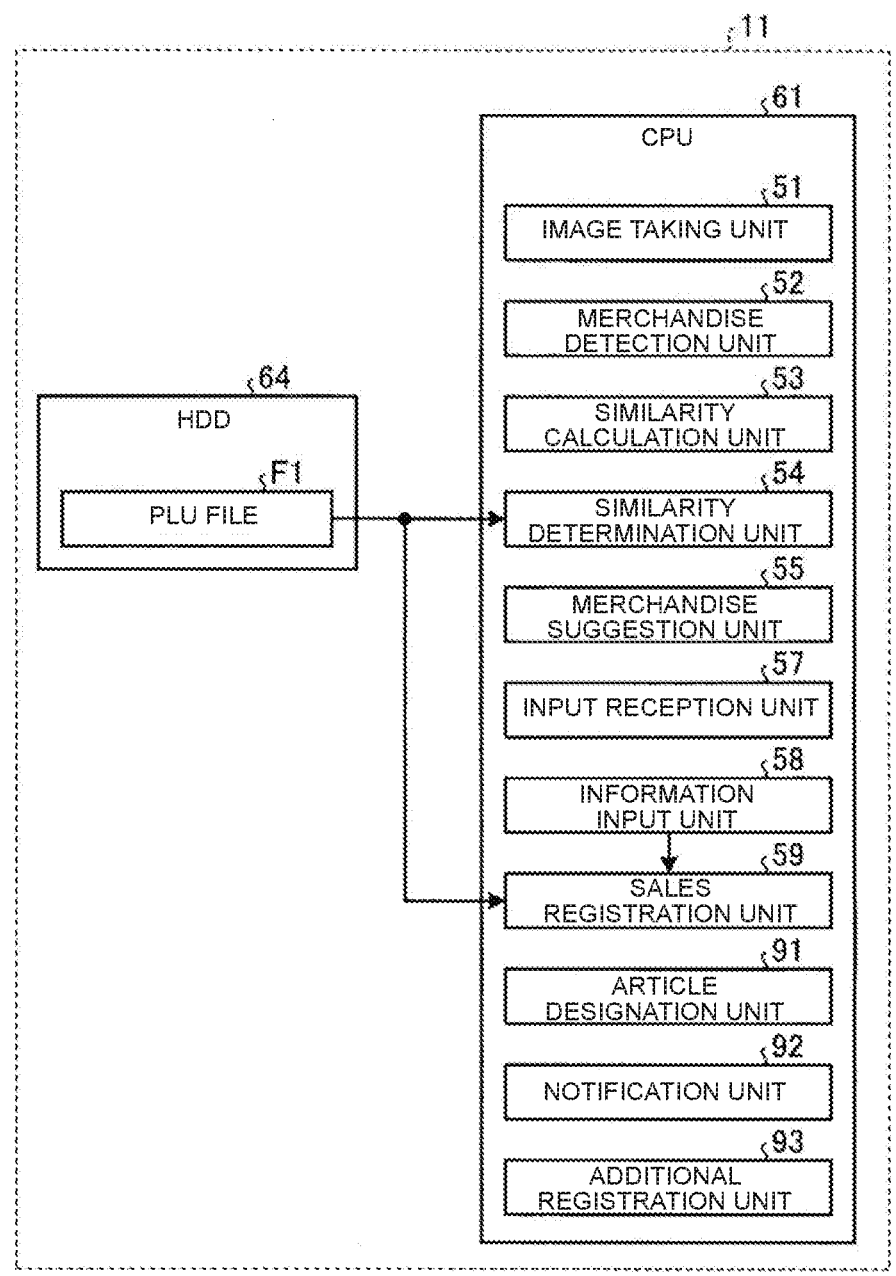
FIG. 4 illustrates functional blocks of the POS terminal.

FIG. 4 illustrates functional blocks of the POS terminal 11. As shown in FIG. 4, the CPU 61 of the POS terminal 11 functions as an image taking unit 51, a merchandise detection unit 52, a similarity calculation unit 53, a similarity determination unit 54, a merchandise suggestion unit 55, an input reception unit 57, an information input unit 58, a sales registration unit 59, which is an sales registration processing section, an article designation unit 91, a notification unit 92, and an additional registration unit 93, by executing the merchandise sales data processing program PR1 and the merchandise recognition accuracy check program PR2.

Merchandise Registration Process and Sales Registration Process

First, an overview of a merchandise registration process and a sales registration process will be described. Here, the merchandise registration process is carried out in accordance with the generic object recognition by the image taking unit 51, the merchandise detection unit 52, the similarity calculation unit 53, the similarity determination unit 54, the merchandise suggestion unit 55, the input reception unit 57, and the information input unit 58 of the POS terminal 11. The sales registration process is carried out by the sales registration unit 59.

The image taking unit 51 outputs an imaging ON signal to the imaging unit 164 and causes the imaging unit 164 to start an imaging operation. The image taking unit 51 sequentially takes frame images acquired by the imaging unit 164 and stored in the RAM 163 after the imaging operation starts. The frame images are taken by the image taking unit 51 in an order stored in the RAM 163.

Figure 5:
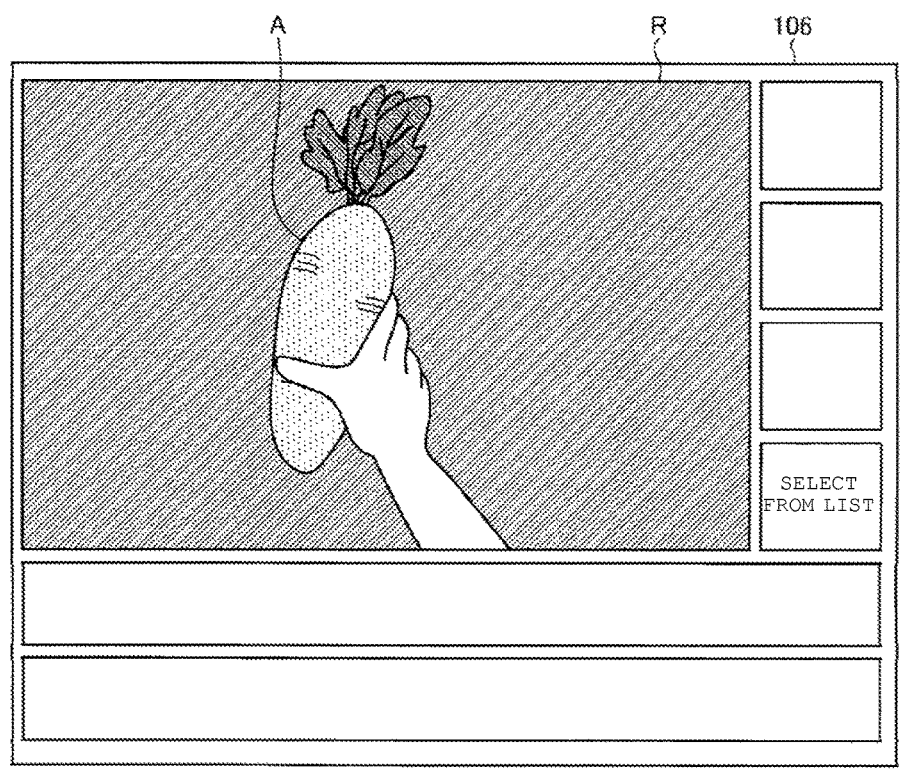
FIG. 5 illustrates a frame image taken by an image taking unit.

FIG. 5 illustrates an example of a frame image taken by the image taking unit 51. As shown in FIG. 5, when the operator holds up the item A near the reading window 103, a part or entire portion of the item A are fit in a reading region R of the imaging unit 164 and are displayed on the display device 106 of the merchandise recognizing device 101.

The merchandise detection unit 52 functions as an extraction section. Specifically, the merchandise detection unit 52 detects the item A included in the frame images acquired by the imaging unit 164 and taken by the image taking unit 51 and extracts feature values therefrom. The merchandise detection unit 52 extracts the feature value of the imaged item A by detecting a part of the entire portion of the item A in the frame images using a pattern matching technology or the like. Specifically, contour lines or the like are extracted from binarized images of the taken frame images. Subsequently, the image of the item A held near the reading window 103 is extracted for sales registration by comparing the contour line extracted from a previous frame image and the contour line extracted from a current frame image.

As another method of extracting the image of the item A, a skin-color region may be detected from the taken frame image. When the skin-color region is detected, i.e., when a hand of a casher is detected, the contour of the item A is predicted based on an assumption that the item A is gripped by the casher and extracted by performing the above-described detection of the contour line near the skin-color region. At this time, when a contour indicating the shape of the hand and a contour of another object near the contour of the hand are detected, the merchandise detection unit 52 detects the item A from the contour of this object.

The merchandise detection unit 52 detects the hues or the surface states such as the surface unevenness of the item A as the feature values from the extracted images of the item A. The merchandise detection unit 52 does not consider the contours or sizes of the item A in order to save a processing time.

The similarity calculation unit 53 functions as a similarity calculation section. Specifically, the similarity calculation unit 53 compares the feature values such as the hues of the item images or the surface states such as surface unevenness of the item (hereinafter, registered item) registered in the PLU file F1 with the feature values acquired when the merchandise detection unit 52 detects the item A, and calculates similarity between the item A and the items registered in the PLU file F1. Here, the similarity indicates how much the images of the item A are similar to the images of the registered items when an item image used to register the item in the PLU file F1 is assumed to be 100%="similarity: 1.0." For example, the similarity may be calculated using different weights of the hue and the surface unevenness.

Recognizing an object included in an image in this way is referred to as generic object recognition. In regard to such generic object recognition, various recognition technologies are described in the following document.

Keiji Yanai "The current states and future directions on Generic Object Recognition" Information Processing Society Journal of Japan, Vol. 48, No. SIG16 [searched on 10 August, 2010], Internet <URL:http://mm.cs.uec.ac.jp/IPSJ-TCVIM-Yanai.pdf>

A technology for performing generic object recognition by partitioning an image into regions for each object is described in the following document.

Jamie Shotton et al. "Semantic Texton Forests for Image Categorization and Segmentation" [searched on 10 August, 2010], Internet <URL:http://citeseerx.ist.psu.edu/viewdoc/download?doi=10.1.1.145.3036&rep=rep1&type=pdf>

Any method of calculating the similarity between the image of the item A and the items registered in the PLU file F1 may be used. For example, the similarity between the imaged image of the item A and each item registered in the PLU file F1 may be calculated as absolute evaluation or relative evaluation.

When the similarity is calculated as absolute evaluation, the image of the item A and the item registered in the PLU file F1 may be compared in an one-to-one manner, and the similarity calculated as the result of the comparison may be directly used. When the similarity is calculated as relative evaluation and five items (item AA, AB, AC, AD, and AE) are registered in the PLU file F1, for example, the similarity is calculated so that the total of the similarities with respect to the five items is 1.0 (100%). For example, similarity of the imaged item A to the item AA is calculated as 0.6, similarity to the item AB may be calculated as 0.1, similarity to the item AC may be calculated as 0.1, similarity to the item AD may be calculated as 0.1, and similarity to the item AE may be calculated as 0.1.

The similarity determination unit 54 compares the similarity between the image of the item A and the image of each item registered in the PLU file F1, with respect to each frame image taken by the image taking unit 51. In the embodiment, a plurality of conditions is set based on the similarity between the image of the registered item and the image of the item A, and the similarity determination unit 54 identifies the item A according to the satisfied condition or determines candidates for the item A. The conditions regarding the similarity are not particularly limited, but conditions a to d, described below, are used in this embodiment.

Here, the conditions a and b are first conditions according to the embodiment and are conditions for identifying the item A acquired by the imaging unit 164 from the items registered in the PLU file F1. The condition c is a second condition according to the embodiment and is a condition for extracting candidates of the item A when different items belonging to the same (merchandise) category do not exist among the candidate items. The condition d is a third condition according to the embodiment and is a condition for extracting candidates of the item A when different items belonging to the same (merchandise) category exist among the candidates of the item A satisfying the condition c.

The similarity determination unit 54 determines (confirms) that the registered item satisfying the condition a or b is the item (hereinafter, confirmed item) corresponding to the item A acquired through the imaging unit 164 in an one-to-one manner. The similarity determination unit 54 determines that the registered items satisfying the condition c are not the confirmed items but candidates of the item A acquired by the imaging unit 164. Then, the candidates for the item A are determined by extracting the registered items satisfying the condition c from the plurality of items registered in the PLU file F1.

The similarity determination unit 54 also determines that the registered items (different items belonging to the same (merchandise) category) satisfying the condition d is not the confirmed item but candidates for the item A acquired through the imaging unit 164. The candidates for the item A are determined by extracting the registered items satisfying the condition d from the plurality of items registered in the PLU file F1.

When the conditions a to c are set according to the similarity, for example, the conditions a to c may be set according to a plurality of threshold value set in advance although the details are not particularly limited. Here, the conditions a to c are set according to first to third threshold values. The magnitude relation of the first to third threshold values here is "first threshold value>second threshold value>third threshold value."

The similarity determination unit 54 counts the number of times the similarity between images of the item A and one of the registered items, which is defined in advance, is equal to or greater than the first threshold value (for example, 90%) and determines that the condition a is satisfied when the number of times is equal to or greater than a predetermined number. When the first threshold value is set to be sufficiently high so as not to make erroneous determination, the predetermined number may be 1.

When the similarity between the item A and the registered item is less than the first threshold value (for example, 90%) and is equal to or greater than the second threshold value (for example, 75%) that is less than the first threshold value, the similarity determination unit 54 determines that the condition b is satisfied. The similarity determination unit 54 determines that the registered item satisfying the condition b is the confirmed item, but a confirmation operation by an operator is necessary. The similarity determination unit 54 may count the number of times the similarity between the item A and the registered item is less than the first threshold value (for example, 90%) and is equal to or greater than the second threshold value (for example, 75%) and determine that the condition b is satisfied when the number of times is equal to or greater than a predetermined number.

When the similarity between the item A and the registered item is less than the second threshold value (for example, 75%) and is equal to or greater than the third threshold value (for example, 10%) that is less than the second threshold value, the similarity determination unit 54 determines that the condition c is satisfied. Further, the similarity determination unit 54 may count the number of times the similarity is less than the second threshold value (for example, 75%) and is equal to or greater than the third threshold value (for example, 10%) and determine that the condition c is satisfied when the number of times is equal to or greater than a predetermined number.

The conditions a to c may be appropriately set according to the magnitude of the similarity, the counted number of times, or the like and are not limited to the above-described examples. The predetermined numbers used to determine the conditions a to c may be different number.

When different items belonging to the same category (merchandise) exist among the registered items satisfying the condition c, the similarity determination unit 54 sums the similarities of the different items. Then, when the total similarity obtained by summing the similarities of the different items is equal to or greater than the second threshold value (for example, 75%), which is defined in advance, the similarity determination unit 54 determines that the condition d is satisfied.

The similarity determination unit 54 generates ranking of the registered items in the orders of the magnitude of the similarity.

The merchandise suggestion unit 55 notifies the operator or a customer that the item A acquired through the imaging unit 164 is identified as one of the registered items satisfying the condition a or b, for example, by outputting an image or an audio signal.

More specifically, the merchandise suggestion unit 55 causes the display device 106 to display an identification screen 71 (see FIG. 6) indicating that the item (confirmed merchandise) acquired by the imaging unit 164 is identified as the registered satisfying the condition a.

Figure 6:
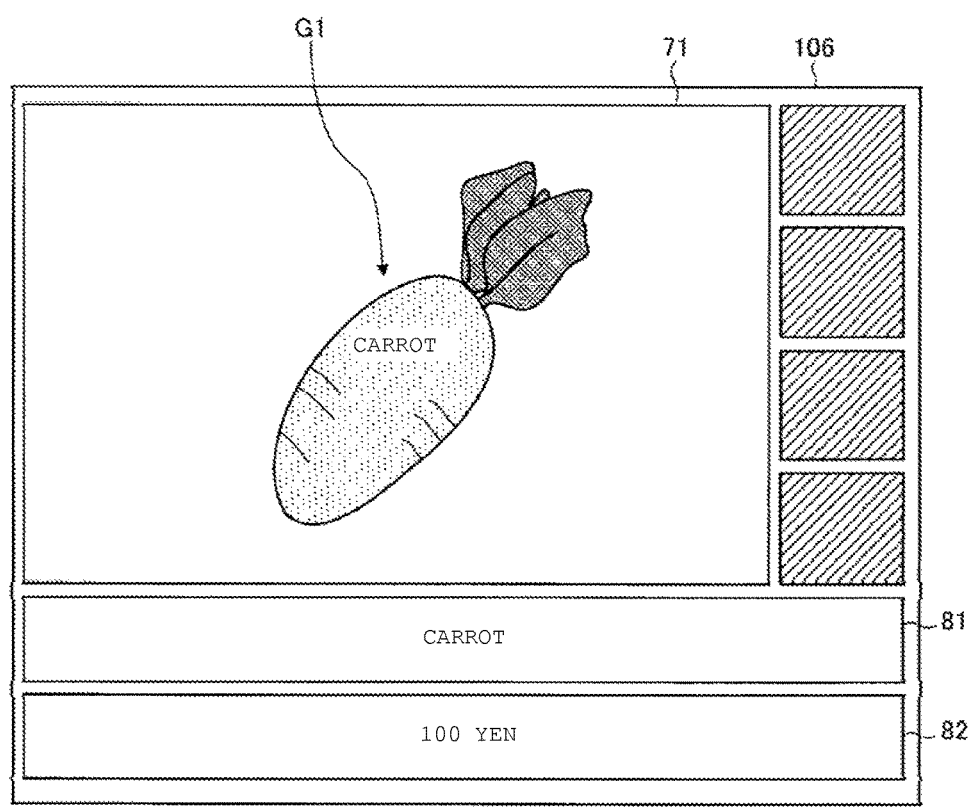
FIG. 6 illustrates an identification screen.

FIG. 6 illustrates an example of the identification screen 71. When the registered item satisfying the condition a exists, the merchandise suggestion unit 55 stops displaying the acquired image of the reading region R (see FIG. 5), reads out an illustration image G1 and a merchandise name "carrot" corresponding to the identified item from the PLU file F1, and displays the illustration image G1 and the merchandise name "carrot" on the identification screen 71. The merchandise suggestion unit 55 displays the merchandise name of the identified item read out from the PLU file F1 and the merchandise price (unit price) in a merchandise name display region 81 and a price display region 82, respectively. The merchandise suggestion unit 55 may display a merchandise (photo) image read out from the PLU file F1 instead of the illustration image G1. The embodiment is not limited thereto, but the illustration or merchandise image may not be displayed and the merchandise name may be displayed on the identification screen 71. In this case, the audio output unit 165 notifies that the item is identified. An audio signal may be a merchandise name associated with the item and registered in advance or may be, for example, an electronic sound such as a blip.

The merchandise suggestion unit 55 causes the display device 106 to display a confirmation screen 72 (see FIG. 7) used to accept a confirmation that the registered item (identified item) satisfying the condition b is the item A acquired by the imaging unit 164.

Figure 7:
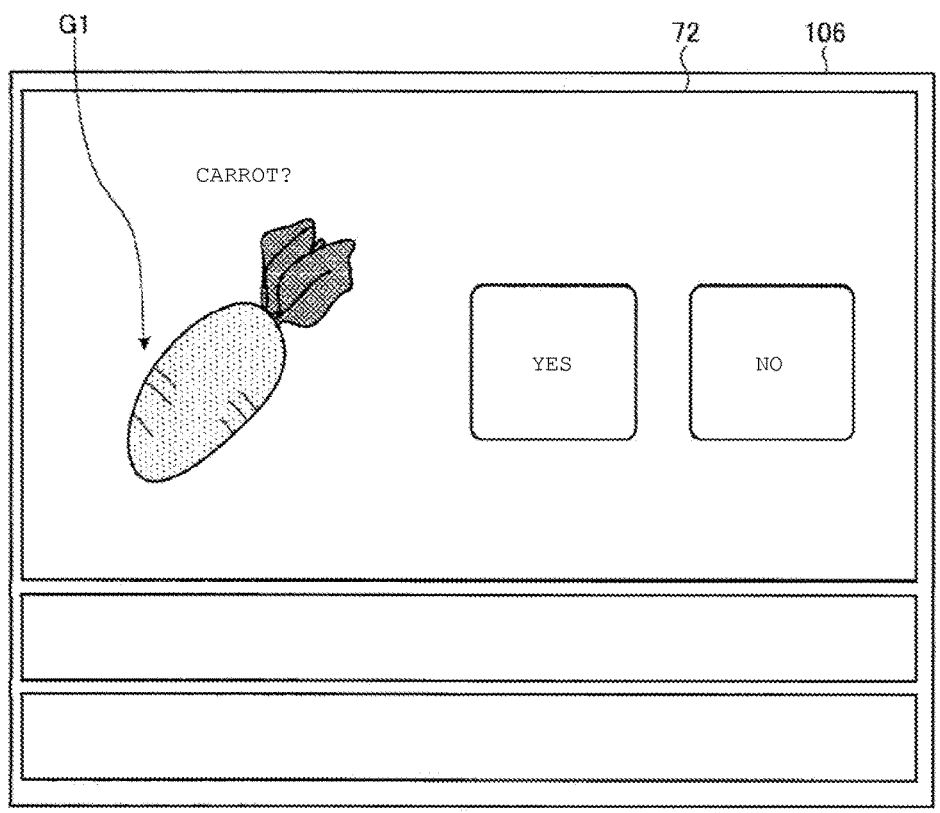
FIG. 7 illustrates a confirmation screen.

FIG. 7 illustrates an example of the confirmation screen 72. When the registered item satisfying the condition b exists, the merchandise suggestion unit 55 reads out an illustration image G1 corresponding to the identified item from the PLU file F1 and displays the illustration image G1 on the confirmation screen 72. The merchandise suggestion unit 55 displays, for example, a message "CARROT?" inquiring about whether or not the item A is an item of the illustration image G1 by using the merchandise name of the identified item read out from the PLU file F1. On the confirmation screen 72, icons such as "YES" and "NO" are displayed so that selection of one may be made through a touch operation on the touch panel 105.

In this way, on the confirmation screen 72, the merchandise name or the merchandise image of the registered item (confirmed merchandise) selected uniquely for one item A is shown as the result of the determination of the similarity, and the item A and the registered item are displayed with an one-to-one relation. Accordingly, the confirmation screen 72 is a screen notifying that the registered merchandise satisfying the condition b is uniquely confirmed as the item A imaged by the imaging unit 164.

The merchandise suggestion unit 55 causes the display device 106 to display information regarding the registered one or more items satisfying the condition c as merchandise candidates. More specifically, the merchandise suggestion unit 55 reads out the illustration images and the merchandise names of the registered items satisfying the condition c from the PLU file F1 and sequentially outputs the registered items in a descending order from the registered item having a higher similarity, which is calculated by the similarity calculation unit 53, to the display device 106. The display device 106 displays the illustration images and the merchandise names of the candidates in the descending order from the top of a merchandise candidate suggestion region 83 (see FIG. 8).

Figure 8:
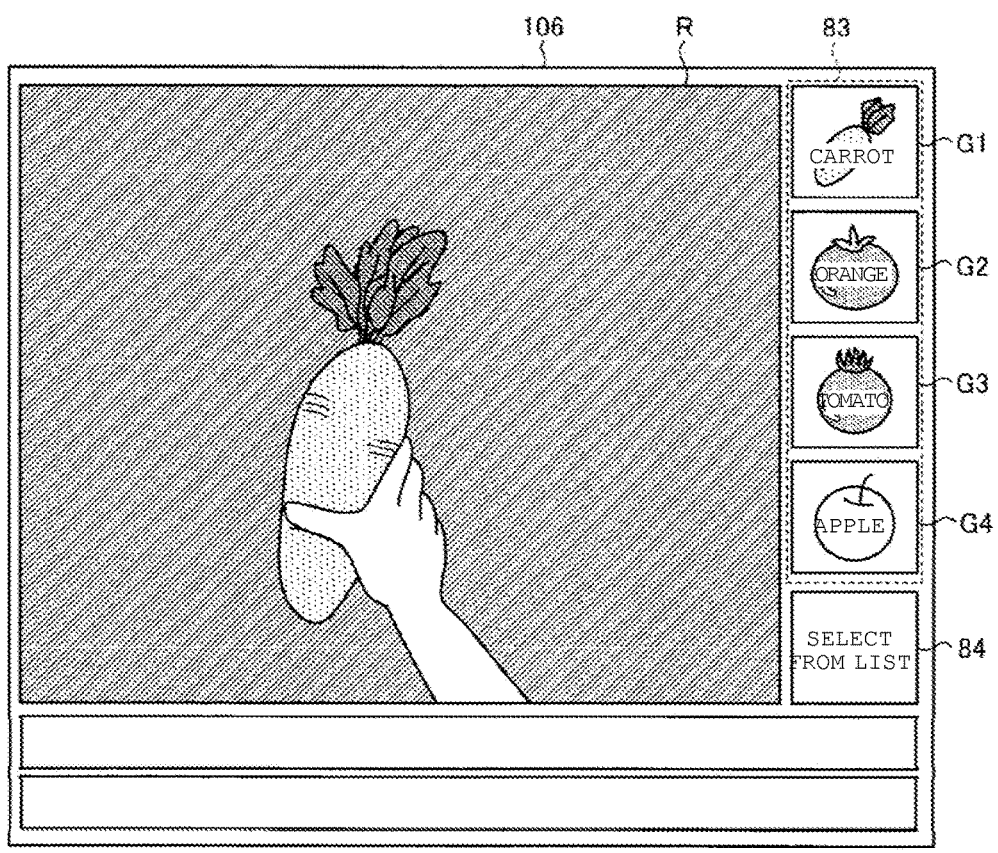
FIG. 8 illustrates a screen in which illustration images of candidates are displayed.

FIG. 8 illustrates a screen example in which illustration images G1, G2, G3, and G4 of the candidates are displayed. As shown in FIG. 8, the illustration images G1, G2, G3, and G4 and the merchandise names of the candidates are displayed in the merchandise candidate suggestion region 83 in the descending order from the top thereof. The illustration images G1, G2, G3, and G4 are selectable in response to a selection operation on the touch panel 105. A selection icon 84 used to select an item corresponding the item A from a merchandise list is formed below the merchandise candidate suggestion region 83 and the item selected from the merchandise list is processed as the confirmed item described above. In FIG. 8, four candidates corresponding to the illustration images G1 to G4 are displayed, but the number of candidates or the method of displaying the candidates are not particularly limited. Merchandise images (photos) may be displayed as the candidates instead of the illustration images.

The merchandise suggestion unit 55 causes the display device 106 to display information regarding the registered items which are different items in the same (merchandise) category satisfying the condition d as the candidates. More specifically, the merchandise suggestion unit 55 reads out illustration images and merchandise names of the registered items (different items in the same (merchandise) category) satisfying the condition d from the PLU file F1 and sequentially outputs the registered items in a descending order from the registered item having the higher similarity, which is calculated by the similarity calculation unit 53, to the display device 106.

The input reception unit 57 receives various inputs corresponding to operations on the display device 106 via the touch panel 105 or the keyboard 107. For example, the input reception unit 57 receives an input (confirmation input) indicating that the item of the displayed illustration image G1 is finally confirmed to be the item A based on a selection operation on the confirmation screen 72 (see FIG. 7). The merchandise suggestion unit 55 displays the above-described confirmation screen 71 on the display device 106 when the input reception unit 57 receives a confirmation input.

The input reception unit 57 receives an input of selecting one from the illustration images G1 to G4 (see FIG. 8) of the candidates displayed on the display device 106. The input reception unit 57 receives the input indicating that the registered item corresponding to the selected illustration image is the item A. When the merchandise detection unit 52 can detect the plurality of items to be purchased, the input reception unit 57 may receive an input of selecting a plurality of items from the candidates. When the input reception unit 57 receives the input, the merchandise suggestion unit 55 causes the display device 106 to display the identification screen 71 on which the selected item is displayed as the identified item.

In regard to the item identified in the above-described way, the information input unit 58 inputs information (for example, a merchandise ID or a merchandise name) indicating the item A to the sales registration unit 59 via the connection interface 175.

The information input unit 58 may input the number of the item to be purchased that is input via the touch panel 105 or the keyboard 107, to the sales registration unit 59 together with the merchandise ID or the like.

The sales registration unit 59 registers the sales of the item A based on the merchandise ID and the number of items input from the information input unit 58. Specifically, the sales registration unit 59 registers the sales by recording the notified merchandise ID, and the merchandise classification, the merchandise name, the unit price, and the like corresponding to this merchandise ID along with the number of items in a sales master file or the like with reference to the PLU file F1.

Merchandise Recognition Accuracy Check Process in Object Recognition

Subsequently, a merchandise recognition accuracy check process carried out in the object recognition will be described. This merchandise recognition accuracy check process carried out is carried out by the image taking unit 51, the merchandise detection unit 52, the similarity calculation unit 53, the similarity determination unit 54, the article designation unit 91, the notification unit 92, and the additional registration unit 93 of the POS terminal 11.

As described above, the POS terminal 11 adopts the generic object recognition of recognizing (detecting) the classification or the like of an article according to the similarity obtained by comparing the feature value of the article (object) to be extracted from the image data acquired by the imaging unit 164 with the collation data (feature value) in the PLU file F1, which is the prepared dictionary.

In the PLU file F1, which is the dictionary used for the generic object recognition, the collation data (feature values) is registered in advance. However, when the collation data (feature values) registered in the PLU file F1 is incomplete, the similarity may be lower and recognition of the item A may be not easy even if the item A is appropriately held.

Accordingly, the POS terminal 11 has an additional registration function of updating the collation data of the PLU file F1. However, when the store person notices the fact that the collation data (feature values) is incomplete during business hours of a store, the checkout has to be temporarily stopped and additional registration has to be performed, thereby taking a lot of efforts.

However, as there is no criteria to determine whether to perform the additional registration of the collation data (feature values), the store person cannot know whether to perform the additional registration.

The POS terminal 11 according to the embodiment is configured to notify of the necessity of the additional registration of the collation data (feature values) for the object recognition. That is, the CPU 61 of the POS terminal 11 functions as the image taking unit 51, the merchandise detection unit 52, the similarity calculation unit 53, the similarity determination unit 54, the article designation unit 91, the notification unit 92, and the additional registration unit 93 when executing the merchandise recognition accuracy check program PR2, as shown in FIG. 4. Each unit related to the merchandise recognition accuracy check process carried out for the object recognition will be described below.

The article designation unit 91 functions as a selection section and determines a target item of the merchandise recognition accuracy check from the PLU file F1, which is the prepared dictionary. The article designation unit 91 determines the target item of the merchandise recognition accuracy check based on the operator selecting the merchandise name of the item from a list of the registered items stored in the PLU file F1.

The notification unit 92 notifies the user of the result of the merchandise recognition accuracy check process. The notification unit 92 notifies the user that the collation data (feature values) of the selected item should be additionally registered when the similarity rank of an item corresponding to the selected item is not high among the candidates determined based on an image of the selected item. At this time, the notification unit 92 notifies the user of the additional registration in 3 ways according to the similarity of the target item. The notifying ways may be two ways or four or more ways. The notification unit 92 carries out the following process for both a normal recognition determination and a real-time recognition determination (described below).

Next, the details of the three notification ways in which the notification unit 92 uses will be described.

First, the notification carried out when the similarity rank of the item selected for the target of the merchandise recognition accuracy check process is high will be described. When the similarity rank of the item selected for the target of the merchandise recognition accuracy check process is high, the notification unit 92 operates to display a screen indicating that the additional registration is unnecessary, to give notification to the user. Here, the fact that the similarity rank of the selected item is high means that the selected item is ranked in the first place among the candidates or the item A is identifiable as the selected item based on the condition described above.

Next, the notification carried out when the similarity rank of the item selected as the target of the merchandise recognition accuracy check process is mid-level will be described. When the similarity rank of the item selected as the target of the merchandise recognition accuracy check process is mid-level, the notification unit 92 operates to display a screen indicating that the additional registration is recommended, to give notification to the user. Here, the fact that the similarity rank of the selected item is mid-level means that the selected item is ranked in a lower place than the first place. For example, the selected item is ranked in the second place to the fourth place. However, the mid-level rank is not limited to the second place to the fourth place, but may include places equal to or lower than the fifth place.

Next, the notification carried out when the similarity rank of the item selected as the target of the merchandise recognition accuracy check process is low will be described. When the similarity rank of the item selected as the target of the merchandise recognition accuracy check process is low, the notification unit 92 operates to display a screen indicating that the additional registration is necessary, to give notification to the user. Here, the fact that the similarity rank of the selected item is low means that the selected item is ranked lower than the other candidates to be displayed. For example, the selected item is ranked in a place equal to or lower than the fifth place. The notification method is not limited to the screen display, and the notification may be achieved by an audio signal.

The additional registration unit 93 additionally registers the collation data (feature values) for the selected item that is registered in advance in the PLU file F1. Specifically, the additional registration unit 93 performs the update by taking images of the item to acquire additional collation data (feature values). The collation data (feature values) may be stored (recorded) to the extent of a predetermined amount. When the total collation data (feature values) reaches the predetermined value, the old collation data (feature values) are erased or the collation data (feature values) are erased at random.

Figure 9A:
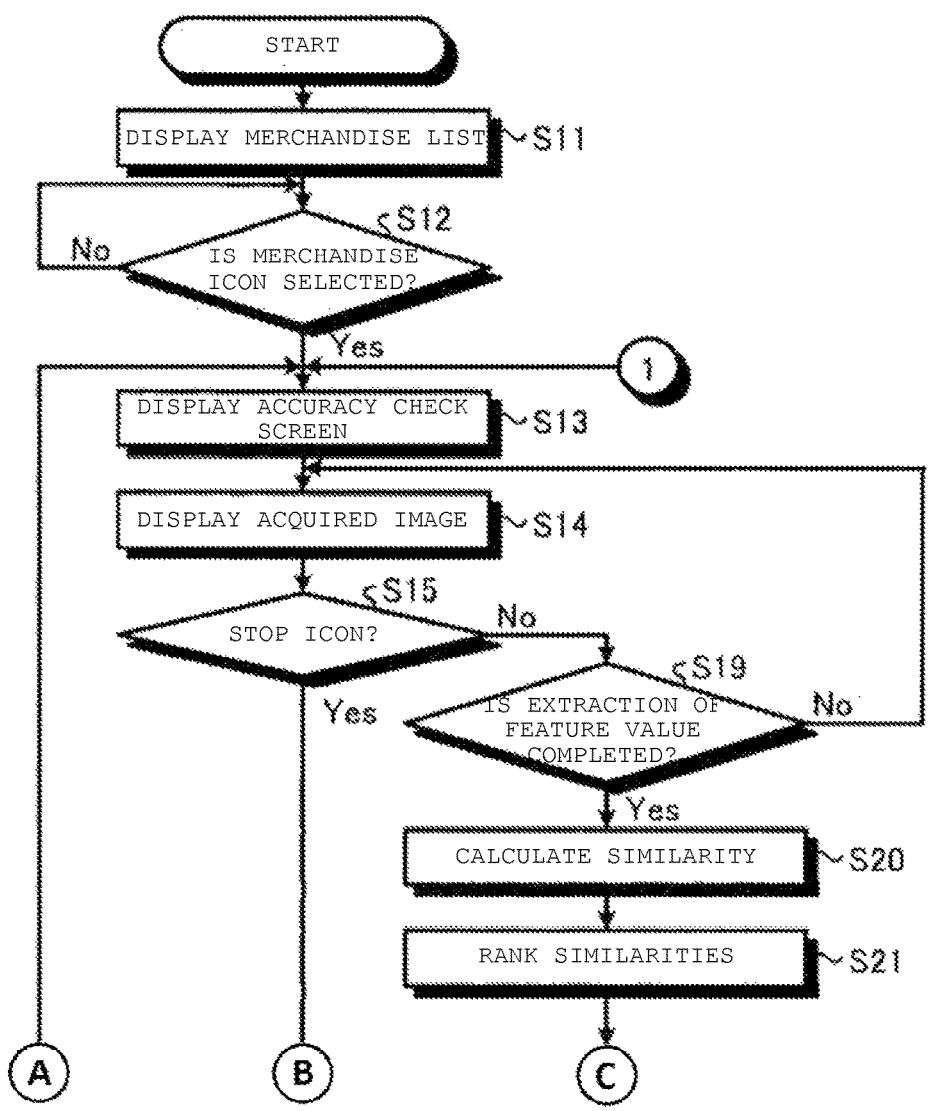
FIGS. 9A to 9C are flowcharts of a merchandise recognition accuracy check process executed by the checkout system.
Figure 9B:
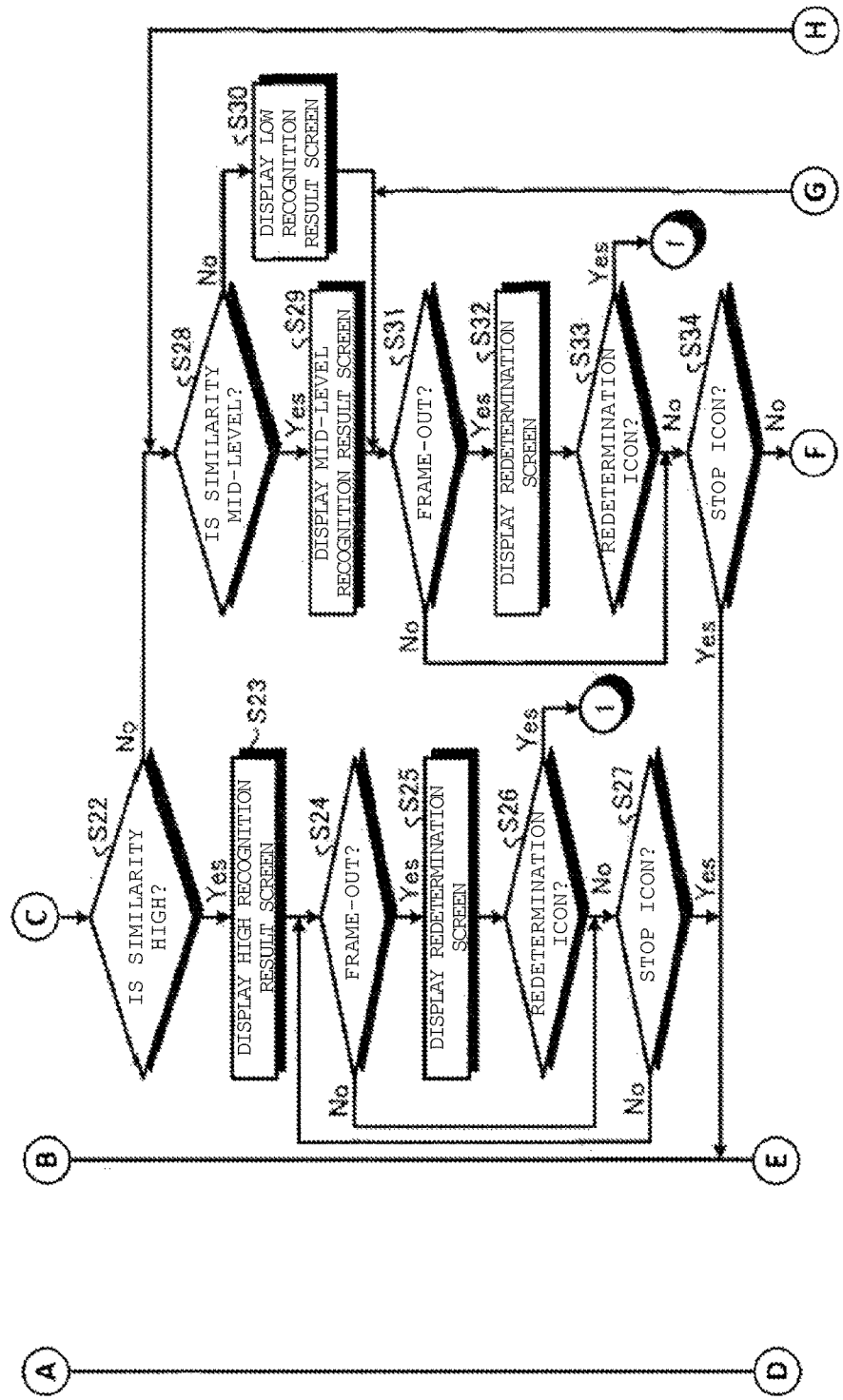
Figure 9C:
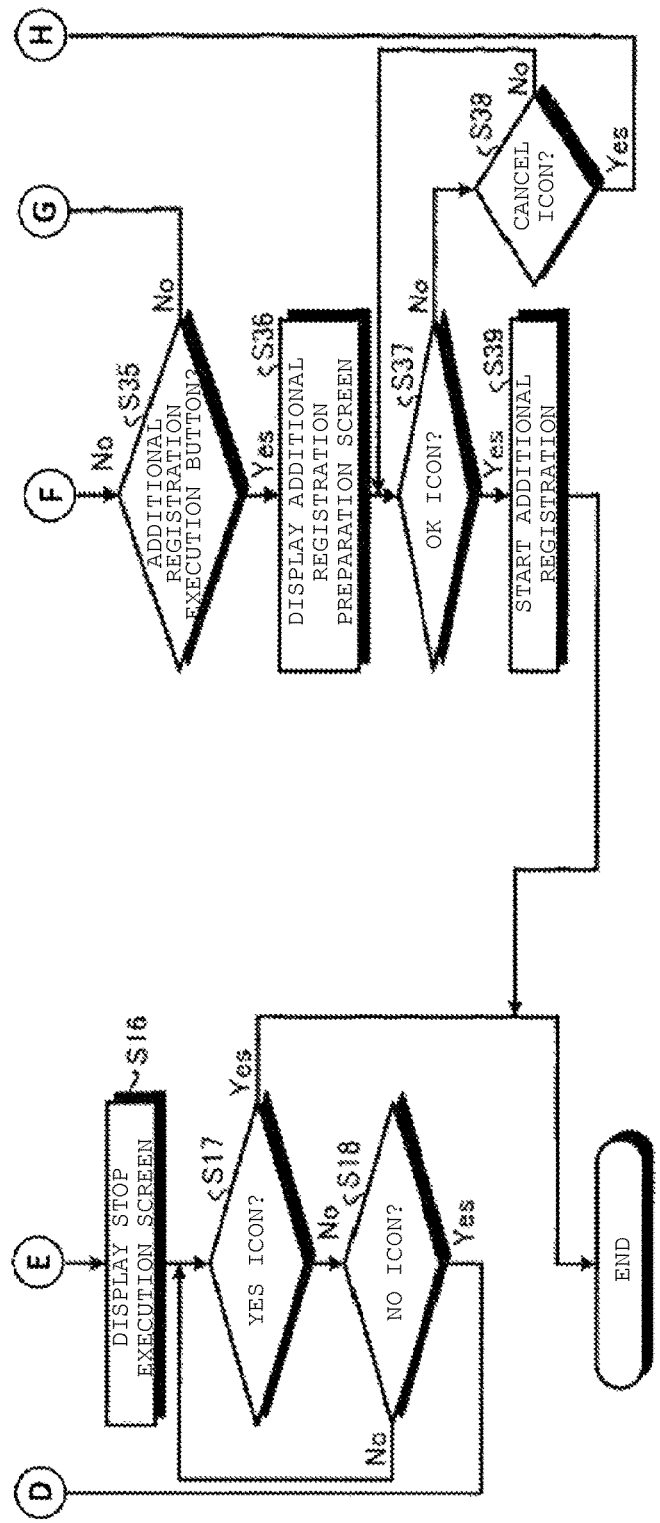

Next, an operation of the checkout system 1 carried out for the merchandise recognition accuracy check process will be described in detail. FIGS. 9A to 9C are flowcharts of the merchandise recognition accuracy check process executed by the checkout system 1. The merchandise recognition accuracy check program PR2 is assumed to be activated beforehand.

As shown in FIG. 9A, the CPU 61 (article destination unit 91) of the POS terminal 11 operates to display a merchandise selection screen (not shown) (step S11). The merchandise selection screen is a screen including a list of the registered items registered in the dictionary and is used for an operator to select target item for the merchandise recognition accuracy check process from the registered items. The operator may select the item A for the merchandise recognition accuracy check process by selecting a merchandise icon displayed on the merchandise selection screen.

Subsequently, the CPU 61 (article destination unit 91) of the POS terminal 11 determines whether selection of the merchandise icon is detected (step S12). When the CPU 61 (article destination unit 91) of the POS terminal 11 does not detect the selection of the merchandise icon (NO in step S12), the CPU 61 (article destination unit 91) of the POS terminal 11 stays at step S12.

When the CPU 61 of the POS terminal 11 detects the selection of the merchandise icon (Yes in step S12), the CPU 61 of the POS terminal 11 operates to display an accuracy check screen G5 (see FIG. 10) (step S13).

Figure 10:
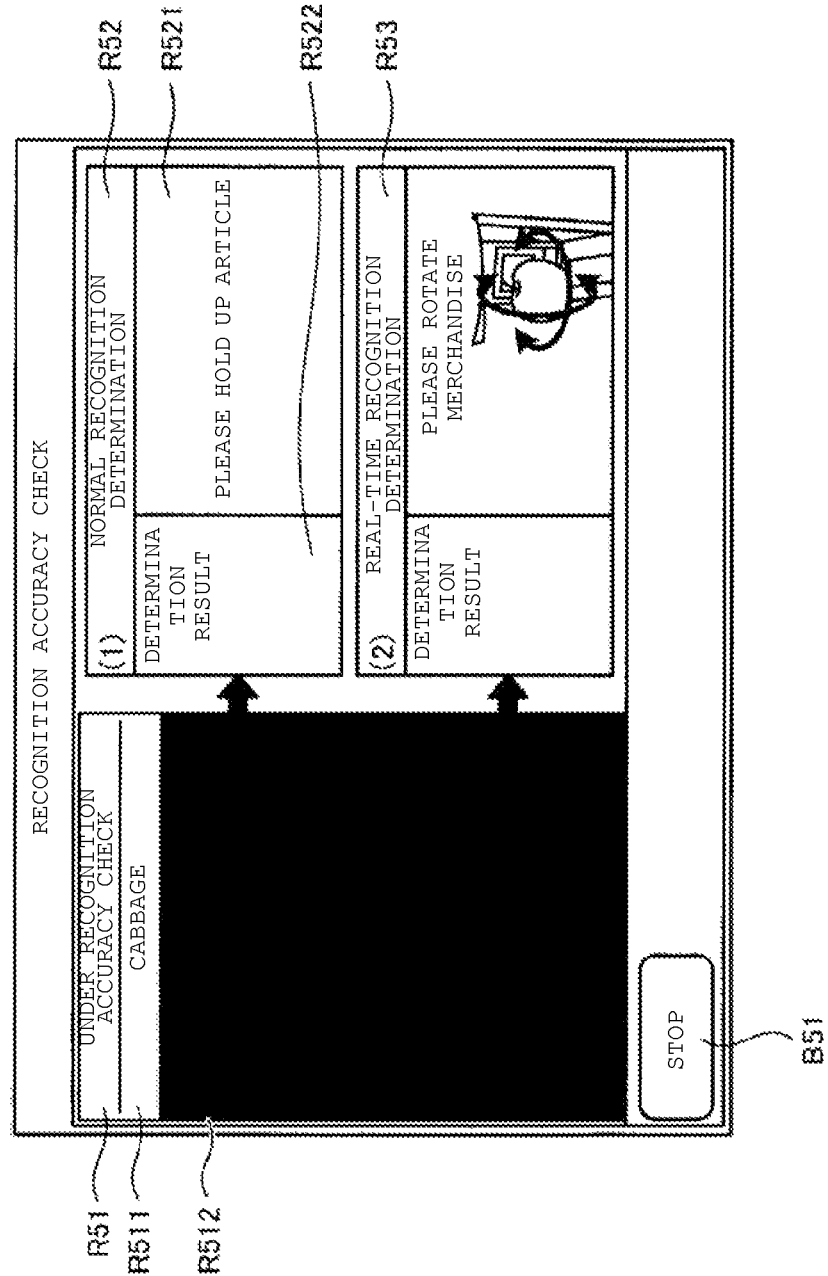
FIGS. 10 and 11 illustrate an accuracy check screen, respectively.

FIG. 10 illustrates an example of the accuracy check screen G5. The accuracy check screen G5 is a screen including a state of the merchandise recognition accuracy check process and a determination result. The accuracy check screen G5 includes a merchandise display region R51, a normal recognition determination region R52, a real-time recognition determination region R53, and a stop icon B51.

The merchandise display region R51 is a region in which an image taken by the image taking unit 51 when an image of the target item of the merchandise recognition accuracy check process is acquired by the imaging unit 164 is displayed. The merchandise display region R51 includes a merchandise name region R511 and an imaging region R512. The merchandise name region R511 is a region in which the merchandise name of the target item selected in advance and subjected to the merchandise recognition accuracy check is displayed. The imaging region R512 is a region in which an image acquired by the imaging unit 164 is displayed. By looking at the image in the imaging region R512, the operator may confirm that the image of the item A is acquired by the imaging unit 164.

The normal recognition determination region R52 is a region in which the determination result of the merchandise recognition accuracy check process based on plural frame images is displayed. The normal recognition determination region R52 includes a determination result region R522 and a message display region R521. The determination result region R522 is a region in which the determination result is displayed. The message display region R521 is a region in which an instruction to carryout the merchandise recognition accuracy check process is displayed. For example, in the message display region R521, a message "Please hold up merchandise" is displayed in an initial state.

The real-time recognition determination region R53 is a region in which the recognition result with respect to a latest frame image is displayed in real time. The stop icon B51 is an icon to stop the merchandise recognition accuracy check process.

The notification unit 92 presents the similarity between the item A and the selected item, in three ways, such as high, mid-level, and low, with respect to the result of the real-time recognition determination. When the similarity is high, a message "determination result OK" is displayed on the real-time recognition determination region R53. When the similarity is mid-level, a triangle mark is displayed on the real-time recognition determination region R53. When the similarity is low, X mark is displayed on the real-time recognition determination region R53. By referring to the real-time recognition determination region R53, the operator can know which position and orientation of the item A should be held toward the imaging unit 164.

In a message region of the real-time recognition determination region R53, an instruction about how to hold the item A for the object recognition is displayed. As the message region prompts the operator to try different positions and orientations of the item A, an image of the item A at a proper position and orientation can be more reliably acquired.

Subsequently, the CPU 61 of the POS terminal 11 operates to display an imaged image G51 acquired by the imaging unit 164 and taken by the image taking unit 51 in the merchandise display region R51 (step S14).

Figure 11:
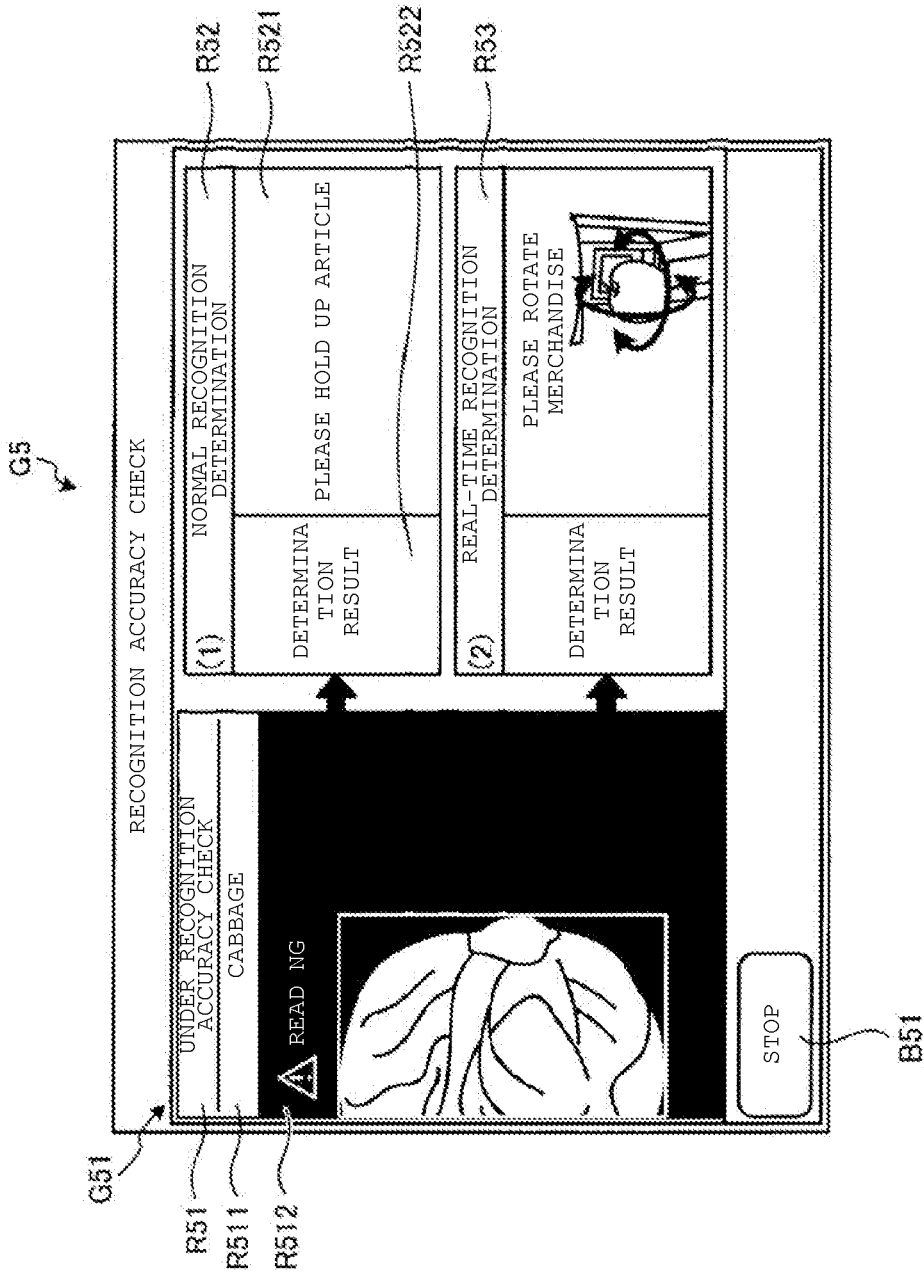

FIG. 11 illustrates an example of the imaged image G51. The imaged image G51 is an image acquired by the imaging unit 164 and taken by the image taking unit 51. The imaged image G51 includes a frame around the item A. The imaged image G51 also includes a message indicating that the item A may not be read when the imaging method is inappropriate. FIG. 11 shows a state in which a cabbage is imaged and a message "READ NG" is displayed.

Subsequently, the CPU 61 of the POS terminal 11 determines whether or not selection of the stop icon B51 displayed in the accuracy check screen G5 is detected (step S15). When the selection of the stop icon B51 is detected (Yes in step S15), the CPU 61 of the POS terminal 11 operates to display a stop execution screen G6 (step S16).

Figure 12:
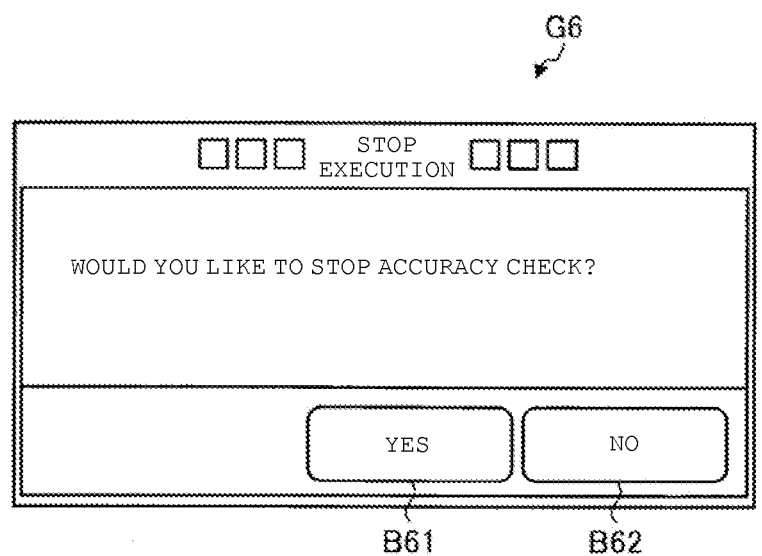
FIG. 12 illustrates a stop execution screen.

FIG. 12 illustrates an example of the stop execution screen G6. The stop execution screen G6 is a screen used to confirm that the merchandise recognition accuracy check process is stopped when the stop icon B51 is selected. Accordingly, the stop execution screen G6 displays a message "Would you like to stop accuracy check?" The stop execution screen G6 includes a YES icon B61 and a NO icon B62. The YES icon B61 is an icon to confirm stop of the merchandise recognition accuracy check process. The NO icon B62 is an icon to cancel the stop of the merchandise recognition accuracy check process.

Subsequently, the CPU 61 of the POS terminal 11 determines whether selection of the YES icon B61 in the stop execution screen G6 is detected (step S17). When the selection of the YES icon B61 is detected (Yes in step S17), the CPU 61 of the POS terminal 11 ends the merchandise recognition accuracy check process.

On the other hand, when the selection of the YES icon B61 is not detected (No in step S17), the CPU 61 of the POS terminal 11 determines whether selection of the NO icon B62 in the stop execution screen G6 is detected (step S18).

When the selection of the NO icon B62 is not detected (No in step S18), the CPU 61 of the POS terminal 11 causes the process to return to step S17. When the selection of the NO icon B62 is detected (Yes in step S18), the CPU 61 of the POS terminal 11 causes the process to return to step S13.

When the selection of the stop icon B51 in the accuracy check screen G5 is not detected (No in step S15), the CPU 61 (the merchandise detection unit 52) of the POS terminal 11 determines whether or not the extraction of the feature value of the item A is completed (step S19). When the extraction of the feature value of the item A is 1 not completed (No in step S19), the CPU 61 (the merchandise detection unit 52, the similarity calculation unit 53, and the similarity determination unit 54) of the POS terminal 11 causes the process to return to step S14.

Conversely, when the extraction of the feature value of the item A is completed (Yes in step S19), the CPU 61 (the similarity calculation unit 53) of the POS terminal 11 calculates the similarity of the item A to the registered items (step S20). Subsequently, the CPU 61 (the similarity determination unit 54) of the POS terminal 11 generates a similarity ranking for the registered items (step S21).

Subsequently, the CPU 61 of the POS terminal 11 determines whether the similarity rank of the item selected as a target of the merchandise recognition accuracy check process is high (step S22). Here, the fact that the similarity rank is high means that the similarity rank of the selected item is in the first place or the item A is identifiable as the selected item based on the condition described above.

When the similarity rank of the selected item is high (Yes in step S22), the CPU 61 (the notification unit 92) of the POS terminal 11 operates to display a high recognition result screen G52 in the normal recognition determination region R52 (step S23).

Figure 13:
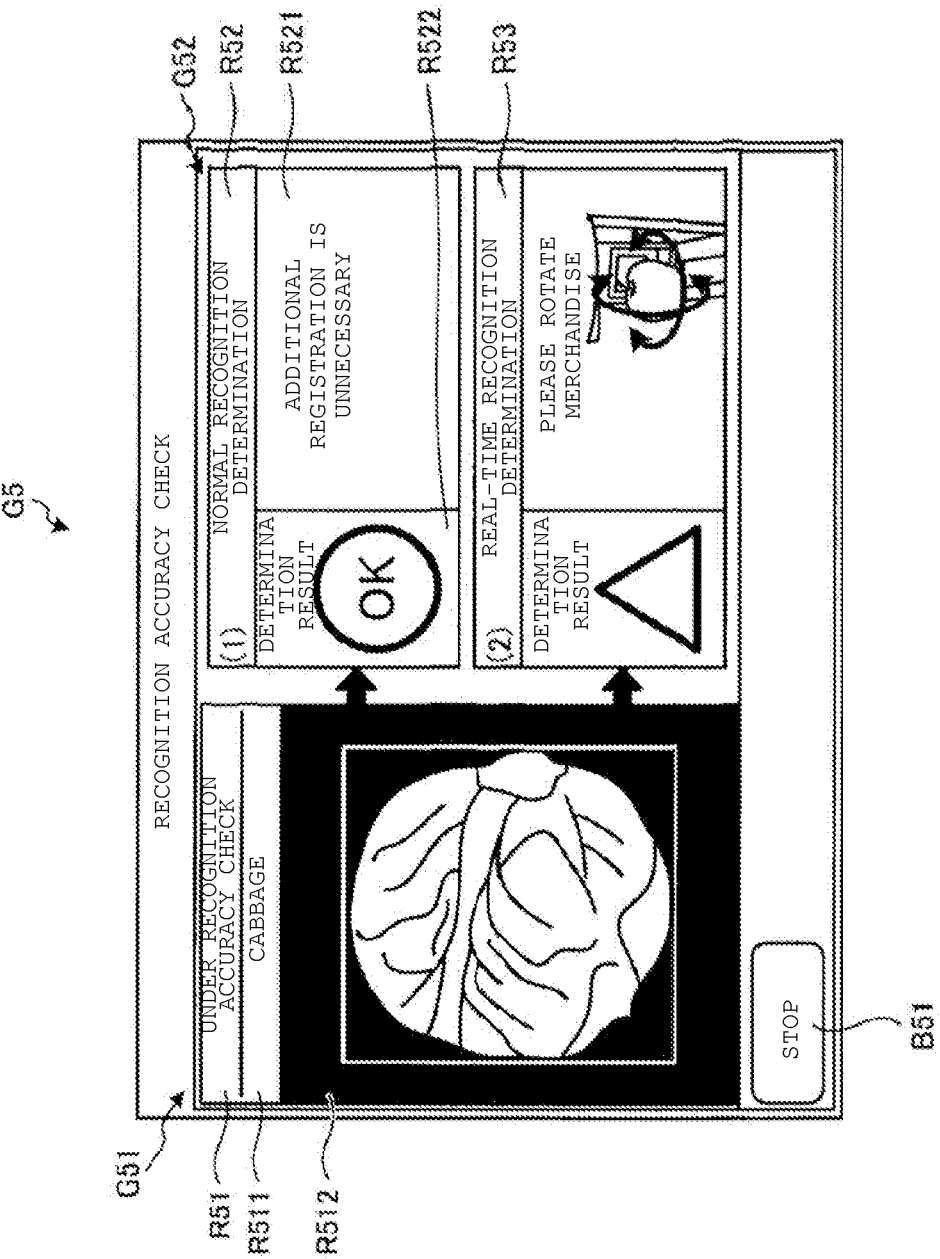
FIG. 13 illustrates a high recognition result screen.

FIG. 13 illustrates an example of the high recognition result screen G52. The high recognition result screen G52 is a screen displayed when the item A has high similarity with the selected item and additional registration of collation data is unnecessary. Here, the additional registration means that the collation data (feature values) of the merchandise is added and stored in the dictionary in which the collation data (feature values) is registered. In the high recognition result screen G52, a mark indicating that the similarity is high is displayed in the determination result region R522. The high recognition result screen G52 includes a message "Additional registration is unnecessary (automatically confirmable merchandise)" in the message display region R521. The determination result displayed on the real-time recognition determination region R53 in FIG. 13 indicates that the similarity rank of the selected item is mid-level.

Subsequently, the CPU 61 of the POS terminal 11 determines whether or not the item A is framed out from the imaged image G51 corresponding to the imaging region of the imaging unit 164 (step S24). When the item A is not framed out (No in step S24), the CPU 61 of the POS terminal 11 determines whether or not selection of the stop icon B51 is detected (step S27). Conversely, when the item A is framed out (Yes in step S24), the CPU 61 of the POS terminal 11 operates to display a redetermination screen G55 in the imaging region R512 (step S25).

Figure 14:
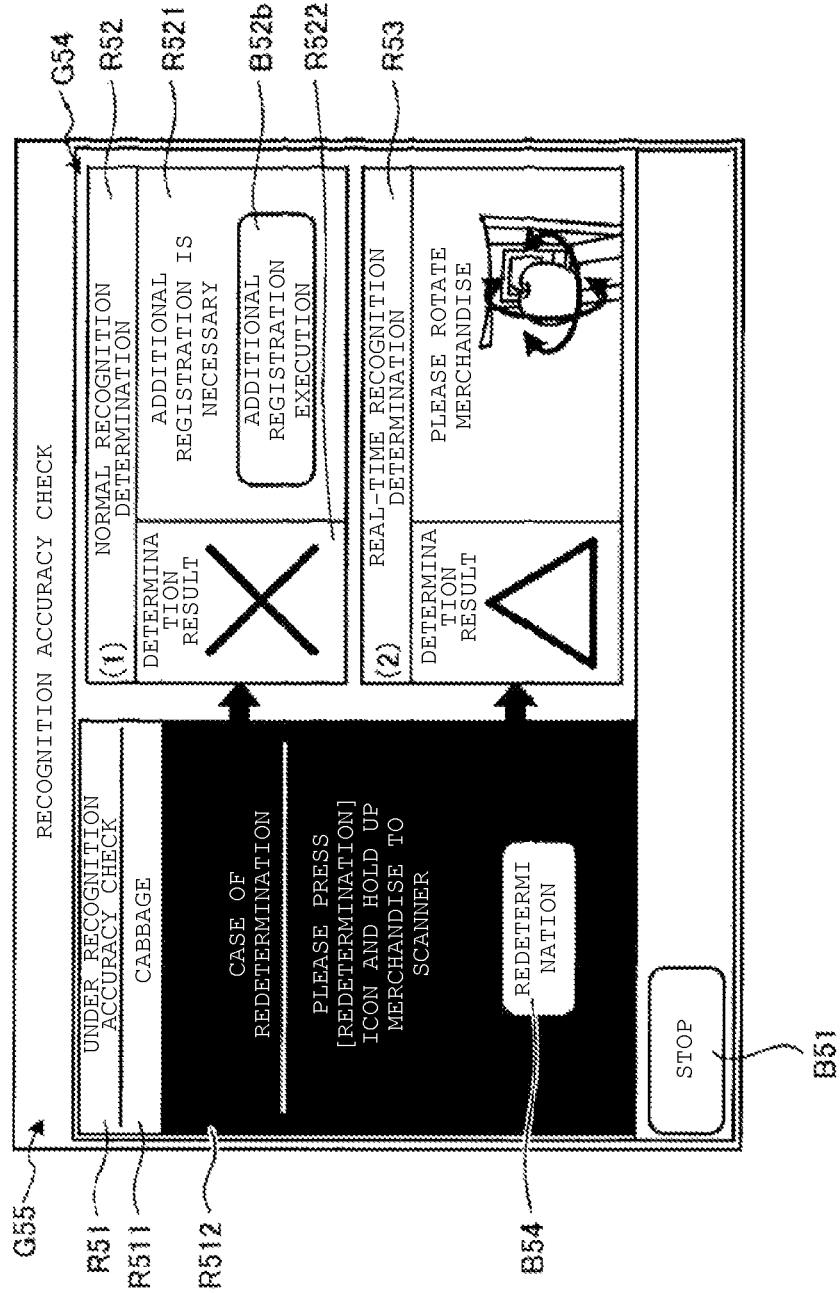
FIG. 14 illustrates a redetermination screen.

FIG. 14 illustrates an example of the redetermination screen G55. The redetermination screen G55 is a screen which inquires the operator of whether to carry out the accuracy check again. The redetermination screen G55 is displayed in the imaging region R512 when the item A is framed out after the accuracy check. The redetermination screen G55 includes a message "in case of redetermination, please press [redetermination] icon and hold up merchandise near scanner." The redetermination screen G55 includes a redetermination icon B54. The redetermination icon B54 is an icon to return to the initial state and carry out the merchandise recognition accuracy check process again. The determination result displayed on the real-time recognition determination region R53 in FIG. 14 indicates that the similarity rank of the selected item is mid-level.

Subsequently, the CPU 61 of the POS terminal 11 determines whether or not selection of the redetermination icon B54 is detected (step S26). When the selection of the redetermination icon B54 is detected (Yes in step S26), the CPU 61 of the POS terminal 11 causes the process to return to step S13, which is the initial state. When the selection of the redetermination icon B54 is not detected (No in step S26), the CPU 61 of the POS terminal 11 determines whether or not selection of the stop icon B51 is detected (step S27).

When the selection of the stop icon B51 is detected (Yes in step S27), the CPU 61 of the POS terminal 11 causes the process to proceed to step S16 and operates to display the stop execution screen G6. When the selection of the stop icon B51 is not detected (No in step S27), the CPU 61 of the POS terminal 11 causes the process to return to step S24.

When the similarity rank of the selected item is not high (No in step S22), the CPU 61 of the POS terminal 11 determines whether or not the similarity rank of the item selected as a target for the merchandise recognition accuracy check process is mid-level (step S28). Here, the fact that the similarity rank of the selected item is mid-level means that the similarity rank is in a lower place than the first place. Specifically, the similarity rank of the selected item is in, for example, the second place to the fourth place.

When the similarity rank of the selected item is mid-level (Yes in step S28), the CPU 61 (the notification unit 92) of the POS terminal 11 operates to display a mid-level recognition result screen G53 in the normal recognition determination region R52 (step S29).

Figure 15:
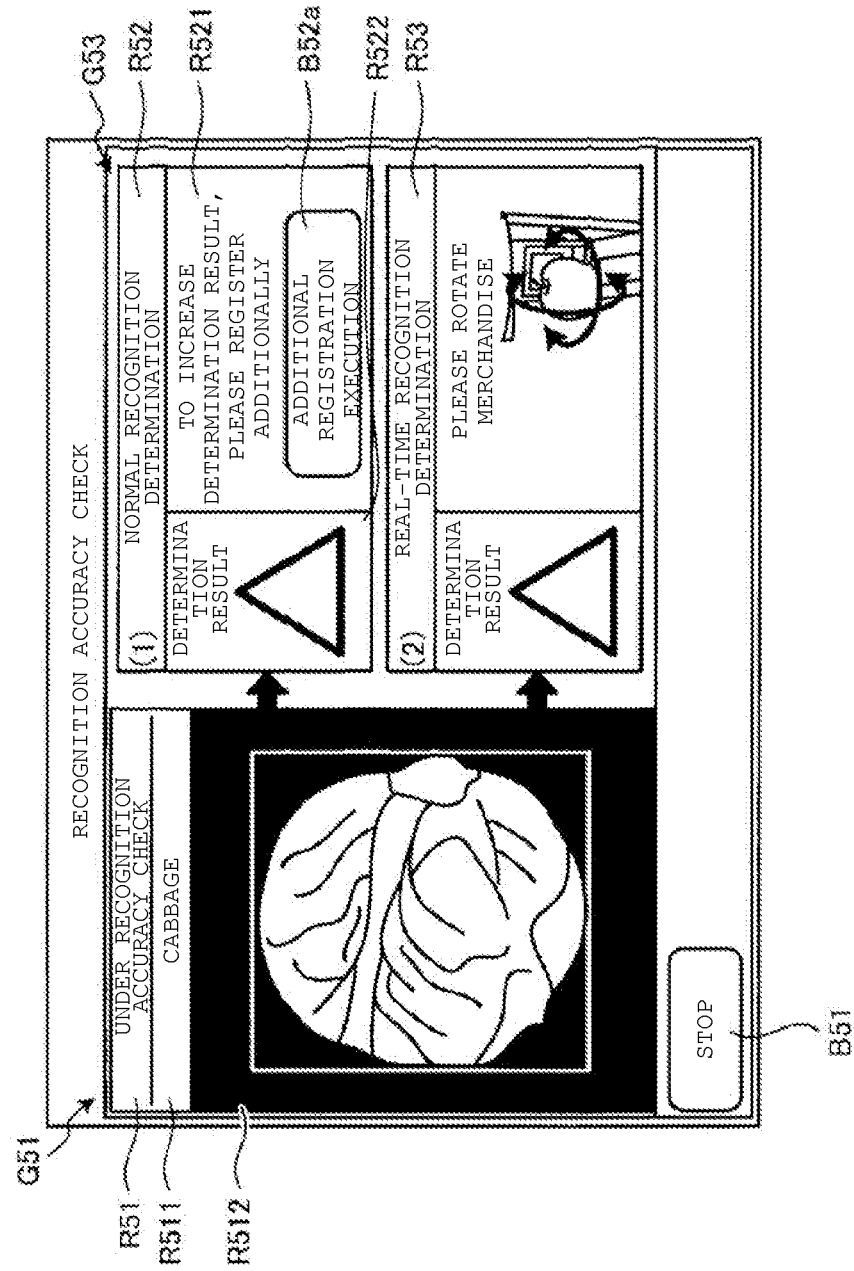
FIG. 15 illustrates a mid-level recognition result screen.

FIG. 15 illustrates an example of the mid-level recognition result screen G53. The mid-level recognition result screen G53 is a screen displayed when the selected item is ranked in a place lower than the first place and the additional registration is recommended. The determination result displayed on the real-time recognition determination region R53 in FIG. 15 indicates that the similarity rank of the selected item is mid-level.

In the mid-level recognition result screen G53, a mark indicating that the similarity is within an allowable range is displayed in the determination result region R522. The intermediate recognition result screen G53 includes a message "To increase determination accuracy, please register additionally" in the message display region R521. The intermediate recognition result screen G53 includes an additional registration execution icon B52a in the message display region R521. The additional registration execution icon B52a is an icon (operator) to start the additional registration process of the feature value of the target item for the merchandise recognition accuracy check.

When the similarity rank of the selected item is not mid-level (No in step S28), the CPU 61 (the notification unit 92) of the POS terminal 11 operates to display a low recognition result screen G54 in the normal recognition determination region R52 (step S30). Here, the fact that the similarity rank of the selected item is low means that the similarity rank of the selected item is lower than that of the candidates to be displayed. Specifically, the similarity rank of the selected item is in a place, for example, equal to or lower than the fifth place.

Figure 16:
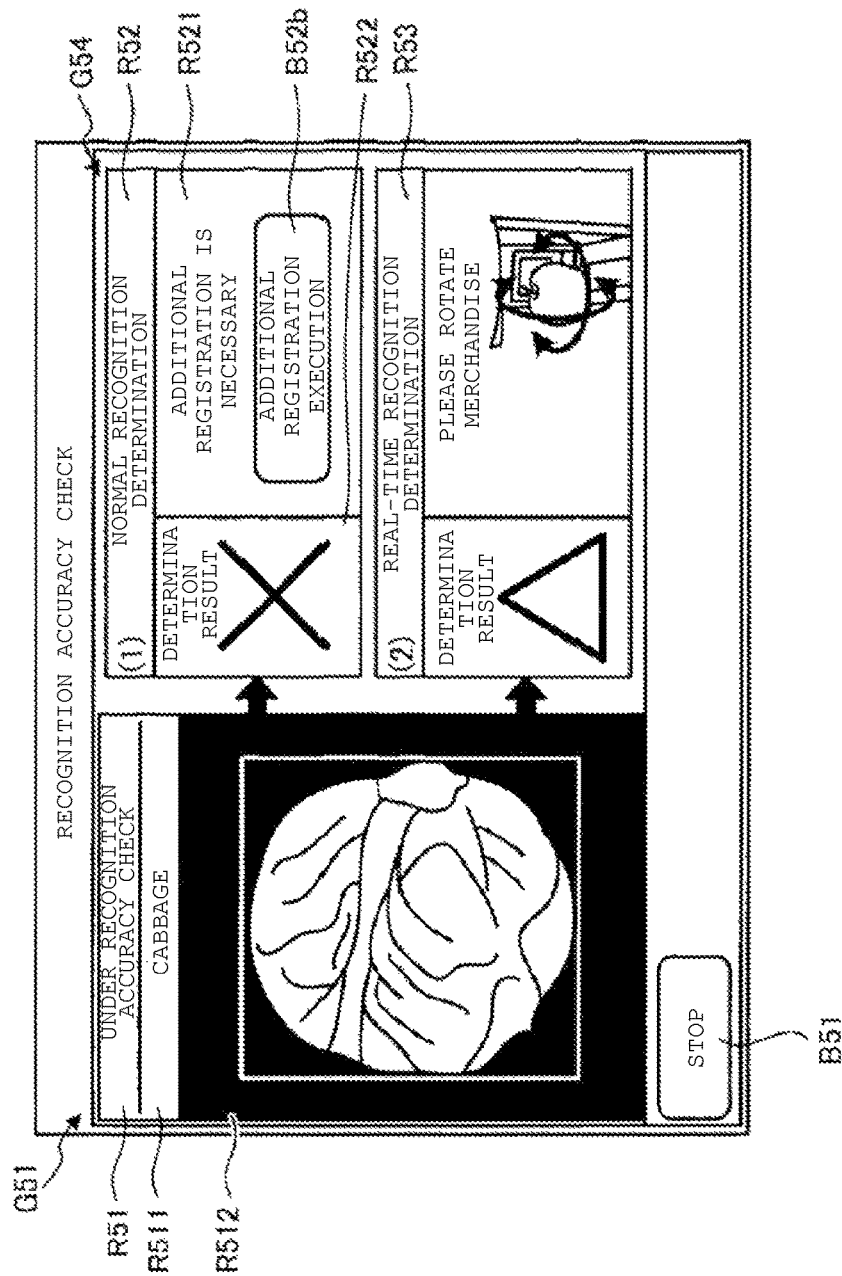
FIG. 16 illustrates a low recognition result screen.

FIG. 16 illustrates an example of the low recognition result screen G54. The low recognition result screen G54 is a screen displayed when the similarity rank of the selected item is lower than that of the candidates to be displayed and the additional registration is necessary. The low recognition result screen G54 is displayed also when the item A may not be detected. For example, when all or a part of the item A is not imaged or the merchandise A is hidden behind a hand holding the item A, the item A may not be detected.

In the low recognition result screen G54, a mark indicating that the similarity is low is displayed in the determination result region R522. The low recognition result screen G54 includes a message "Additional registration is necessary" in the message display region R521. The low recognition result screen G54 also includes an additional registration execution icon B52b in the message display region R521. The additional registration execution icon B52b is an icon pressed when the additional registration is executed. The determination result displayed on the real-time recognition determination region R53 in FIG. 16 indicates that the similarity rank of the selected item is mid-level.

Subsequently, the CPU 61 of the POS terminal 11 executes the same process (step S31 to step S34) as the process (step S24 to step S27) executed when the similarity rank of the selected item is high. A difference from the process executed when the rank is high is that it is determined whether the selection of the additional registration execution icons B52a and B52b used to execute the additional registration is detected.

Specifically, when the selection of the stop icon B51 is not detected (No in step S34), the CPU 61 of the POS terminal 11 determines whether selection of the additional registration execution icons B52a and B52b is detected (step S35).

When the selection of the additional registration execution icons B52a and B52b is not detected (No in step S35), the CPU 61 of the POS terminal 11 causes the process to return to step S31. When the selection of the additional registration execution icons B52a and B52b is detected (Yes in step S35), the CPU 61 (the additional registration unit 93)

of the POS terminal 11 operates to display an additional registration preparation screen G7 (step S36).

Figure 17:
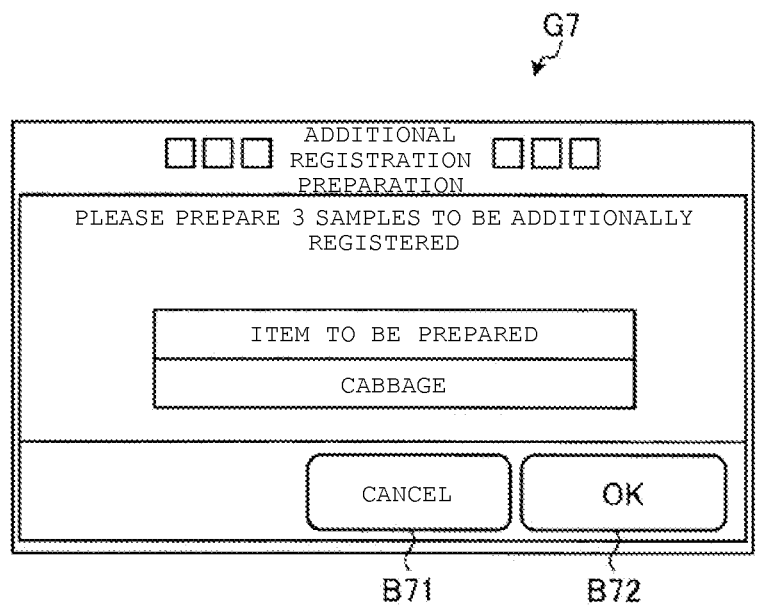
FIG. 17 illustrates an additional registration preparation screen.

FIG. 17 illustrates an example of the additional registration preparation screen G7. The additional registration preparation screen G7 is a screen which instructs the operator to prepare starting of the additional registration process. Accordingly, the additional registration preparation screen G7 includes a message "Please prepare 3 merchandise samples to be additionally registered." The additional registration preparation screen G7 includes a message indicating the item to be prepared. FIG. 17 shows a cabbage as the item to be prepared. The additional registration preparation screen G7 includes a cancel icon B71 and an OK icon B72. The cancel icon B71 is an icon to cancel the additional registration. The OK icon B72 is an icon to complete the preparation and start the additional registration.

Subsequently, the CPU 61 of the POS terminal 11 determines whether or not selection of the OK icon B72 is detected (step S37). When the selection of the OK icon B72 is not detected (No step S37), the CPU 61 of the POS terminal 11 determines whether or not selection of the cancel icon B71 is detected (step S38).

When the selection of the cancel icon B71 is not detected (No in step S38), the CPU 61 of the POS terminal 11 causes the process to return to step S37. Conversely, when the selection of the cancel icon B71 is detected (Yes in step S38), the CPU 61 of the POS terminal 11 causes the process to return to step S28 and operates to display a screen in accordance with the similarity.

When the selection of the OK icon B72 is detected (Yes in step S37), the CPU 61 (the additional registration unit 93) of the POS terminal 11 starts the additional registration (step S39) and ends the process.

As described above, according to the embodiment, the article designation unit 91 determines the target item for the merchandise recognition accuracy check from the PLU file F1. The merchandise detection unit 52 detects the item. A included in the frame image acquired by the imaging unit 164 and taken by image taking unit 51 and extracts the feature value. Then, the similarity calculation unit 53 calculates the similarity between each item registered in the PLU file F1 and the item A by comparing the feature value of each item registered in the PLU file F1 to the feature value of the item A extracted by the merchandise detection unit 52. The notification unit 92 notifies of the necessity of the additional registration of the collation data (feature value) in the PLU file F1 when the similarity of the item A to the selected item determined by the article designation unit 91 is not high. Accordingly, in the embodiment, it is possible to notify of the necessity or non-necessity of the additional registration of the collation data (feature values).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The foregoing embodiments are described by giving the POS terminal 11 as an example of an information processing device. However, the information processing device is not limited to the POS terminal 11. For example, a personal computer or a tablet terminal may be used. In this case, an imaging device such as a scanner may be connected to a personal computer or a tablet terminal.

In the foregoing embodiment, the CPU 61 of the POS terminal 11, which is the information processing device, functions as the image taking unit 51, the merchandise detection unit 52, the similarity calculation unit 53, the similarity determination unit 54, the merchandise suggestion unit 55, the input reception unit 57, the information input unit 58, the sales registration unit 59, the merchandise designation unit 91, the notification unit 92, and the additional registration unit 93. However, a unit other than the CPU 61 of the POS terminal 11 may have these functions. For example, the CPU 161 of the merchandise recognizing device 101 may have all or some of the above-described functions.

In the foregoing embodiments, the collation data is described as the feature values, but the collation data may be a merchandise image (criterion image).

In the foregoing embodiments, the checkout system 1 including the POS terminal 11 and the merchandise recognizing device 101 is applied as the store system, but the embodiments are not limited thereto. The checkout system 1 may be applied to a single device that has the functions of the POS terminal and the merchandise recognizing device 101. A self-checkout device (hereinafter, simply referred to as a self-POS) installed and used in a store such as a supermarket may be exemplified as the single device that has the functions of the POS terminal 11 and the merchandise recognizing device 101.

Figure 18:
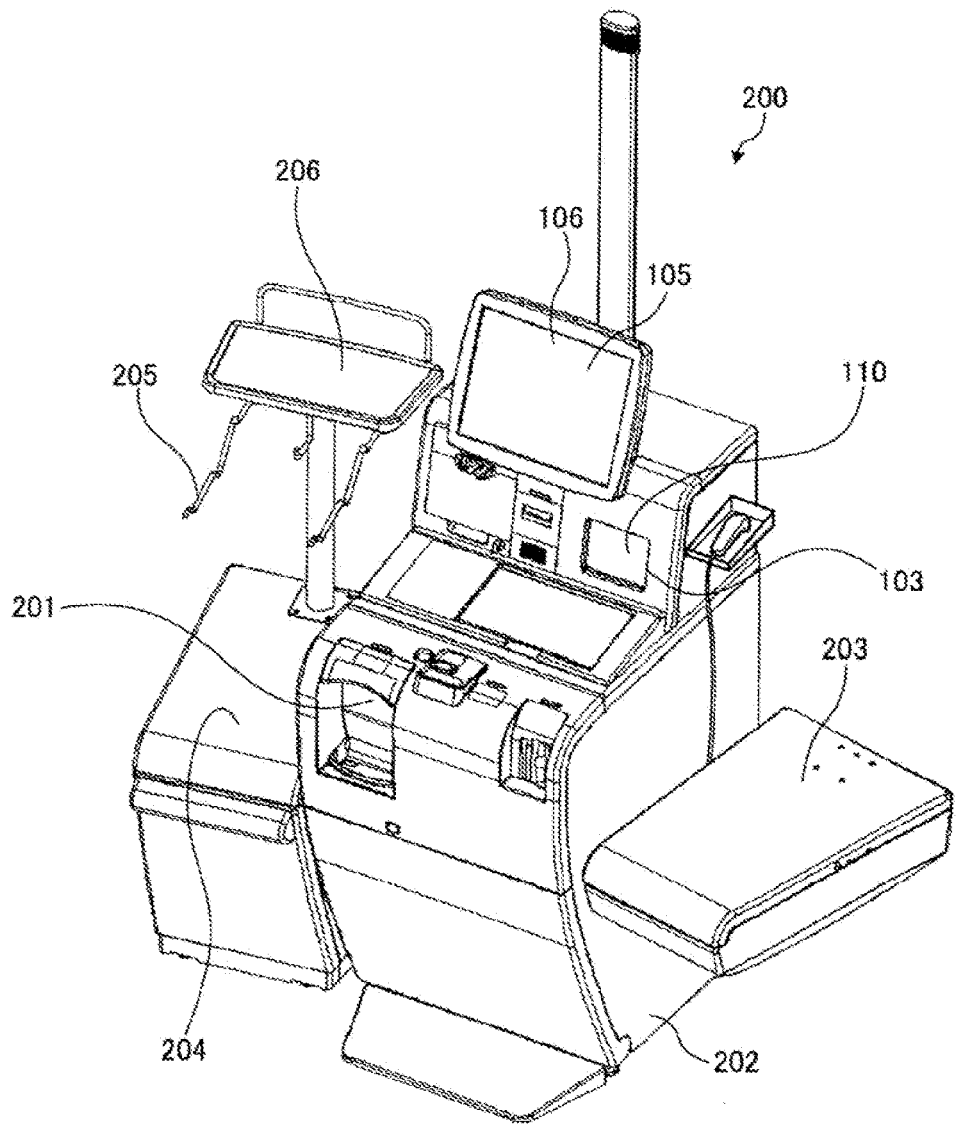
FIG. 18 illustrates an outer appearance of a self-POS.
Figure 19:
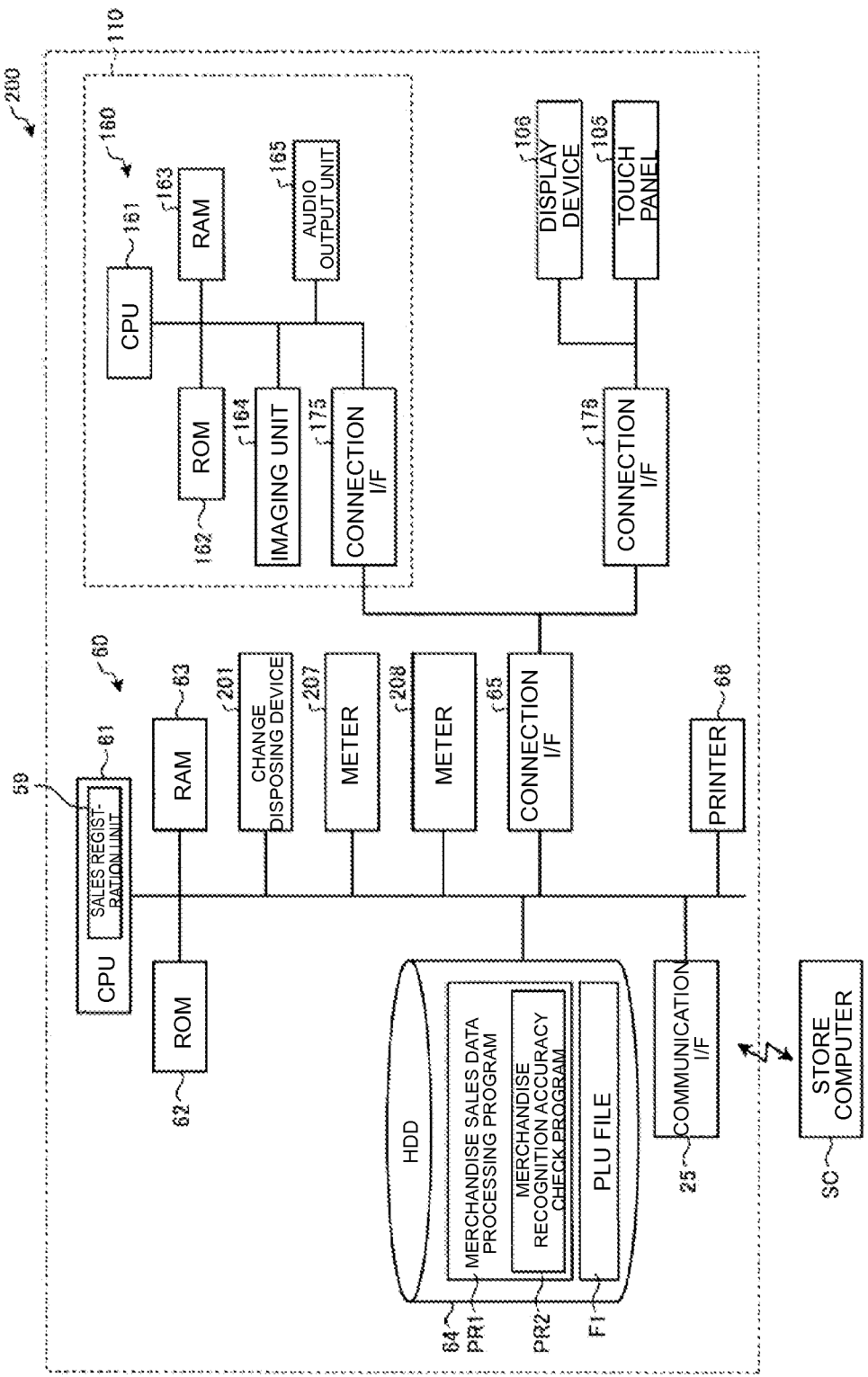
FIG. 19 illustrates a hardware configuration of the self-POS.

Here, FIG. 18 illustrates an outer appearance of a self-POS 200. FIG. 19 illustrates a hardware configuration of the self-POS 200. Hereinafter, the same reference numerals are given to the elements that are same as the elements in FIGS. 1 and 2 and the repeated description will be omitted. As shown in FIGS. 18 and 19, a body 202 of the self-POS 200 includes a display device 106 in which a touch panel 105 is disposed on the surface and a merchandise scanning unit 110 that reads a merchandise image to recognize (detect) classification or the like of item A.

For example, a liquid crystal display device is used as the display device 106. The display device 106 displays, for example, a guide screen for informing a customer of a method of operating the self-POS 200, various input screens, a registration screen displaying merchandise information read by the merchandise scanning unit 110, a checkout screen displaying a sum value of the item A, a deposit value, a change value, and the like and is used to select a payment method.

The merchandise scanning unit 110 causes the imaging unit 164 to read a merchandise image when a customer holds up a code symbol attached to the item A near the reading window 103 of the merchandise scanning unit 110.

A merchandise placement table 203 on which the unsettled item put in a basket are placed is disposed on the right side of the body 202 and a merchandise placement table 204 on which the settled items are placed is disposed on the left side of the body 202. A bag hook 205 on which bags into which the settled item A is inserted are hooked and a temporary holder table 206 on which the settled item A is temporarily put before the inserting are disposed. The merchandise placement tables 203 and 204 may include meters 207 and 208, and thus have a function of confirming that the weights of the item A before and after the settlement are the same.

In the body 202 of the self-POS 200, a change disposing device 201 is disposed for a customer to input paper money or receive change paper money for the settlement.

When the self-POS 200 with such a configuration is applied to a store system, the self-POS 200 functions as an information processing device.

The programs executed by each device of the foregoing embodiments are embedded in advance into a storage medium (a ROM or a storage unit) included in each device for supply, but the embodiments are not limited thereto. The programs may be recorded as a file with an installable format or an executable format in a computer-readable recording medium such as a CD-ROM, flexile disk (FM), a CD-R, a DVD (Digital Versatile Disk) for supply. The storage medium is not limited to the medium independent from a computer or an embedded system and includes a storage medium that stores or temporarily stores a program delivered and downloaded via a LAN or the Internet.

The programs executed by each device of the foregoing embodiments may be stored on a computer connected to a network such as the Internet and be downloaded via a network for supply, or may be supplied or distributed via a network such as the Internet.

What is claimed is:

1. A checkout terminal comprising:
   an operation panel;
   a data storage in which reference image data of each of a plurality of registered items are stored;
   an imaging device configured to acquire a plurality of frame images of an item that is held within an imaging range of the imaging device and generate frame image data from each of the acquired frame images;
   a display; and
   a processor configured to carry out an image recognition operation and an accuracy check operation for image recognition,
   the processor carrying out the accuracy check operation by:
      comparing the frame image data of the plurality of frame images with the reference image data corresponding to one of the plurality of registered items that is selected by a user input made on the operation panel,
      comparing the frame image data of a most-recently-acquired frame image among the plurality of frame images with the reference image data corresponding to the selected registered item,
      displaying:
         a sequence of the frame images that are being acquired by the imaging device in a first region of a screen on the display,
         a first comparison result of the frame image data of the plurality of frame images with the reference image data corresponding to the selected registered item in a second region of the screen,
         a second comparison result of the frame image data of the most-recently-acquired frame image among the plurality of frame images with the reference image data corresponding to the selected registered item in a third region of the screen,
         based on the first comparison result, one of a plurality of recognition result messages on the screen indicating whether additional image data needs to be stored as the reference image data corresponding to the selected registered item, and
         a guidance message on the screen for a user to move the item to improve the second comparison result, and
      based on user input, updating the stored reference image data corresponding to the selected registered item based on the generated frame image data corresponding to at least one of the frame images, and
   the processor carrying out the image recognition operation by:
      controlling the imaging device to acquire an image of an item to be purchased and generating image data of the item to be purchased, and
      identifying the item to be purchased, based on the updated reference image data.

2. The checkout terminal according to claim 1, wherein the processor is further configured to calculate a similarity value based on the comparison result of the frame image data of the plurality of frame images with the reference image data, and display a first of the plurality of recognition result messages recommending updating of the reference image data in a fourth region of the screen when the similarity value indicates less similarity than a first predetermined value.

3. The checkout terminal according to claim 2, wherein the processor is further configured to change the displayed one of the plurality of recognition result messages depending on the similarity value.

4. The checkout terminal according to claim 3, wherein the processor is further configured to display a second of the plurality of recognition result messages suggesting the updating in the fourth region when the similarity value indicates more similarity than a second predetermined value and less similarity than the first predetermined value, and display a third of the plurality of recognition result messages indicating that the updating is required in the fourth region when the similarity value indicates less similarity than the second predetermined value.

5. The checkout terminal according to claim 2, wherein the processor is further configured to display a second of the plurality of recognition result messages indicating that the updating is unnecessary in the fourth region when the similarity value indicates more similarity than the first predetermined value.

6. The checkout terminal according to claim 1, wherein the processor is further configured to:
   calculate a similarity value between each of the generated frame image data and the reference image data,
   determine the number of the frame image data of which similarity value indicates less similarity than a first predetermined value, and
   display a first of the plurality of recognition result messages recommending updating of the reference image data in a fourth region of the screen when the determined number is greater than a second predetermined value.

7. The checkout terminal according to claim 6, wherein the processor is further configured to change the displayed one of the plurality of recognition result messages depending on the number.

8. A method for processing information for an object recognition comprising:
   storing, in a data storage, reference image data of each of a plurality of registered items;
   receiving, on an operation panel, a user input selecting one of the registered items;
   acquiring a plurality of frame images of an item that is held within an imaging range and generating frame image data from each of the acquired frame images;
   comparing the frame image data of the plurality of frame images with the reference image data;

comparing the frame image data of a most-recently-acquired frame image among the plurality of frame images with the reference image data corresponding to the selected registered item;

displaying:
- a sequence of the frame images that are being acquired in a first region of a screen on a display,
- a first comparison result of the frame image data of the plurality of frame images with the reference image data corresponding to the selected registered item in a second region of the screen,
- a second comparison result of the frame image data of the most-recently-acquired frame image among the plurality of frame images with the reference image data corresponding to the selected registered item in a third region of the screen,
- based on the first comparison result, one of a plurality of recognition result messages on the screen indicating whether additional image data needs to be stored as the reference image data corresponding to the selected registered item, and
- a guidance message on the screen for a user to move the item to improve the second comparison result;

based on user input, updating the reference image data corresponding to the selected registered item based on the generated frame image data corresponding to at least one of the frame images;

controlling the imaging device to acquire an image of an item to be purchased and generating image data of the item to be purchased; and identifying the item to be purchased, based on the updated reference image data.

9. The method according to claim 8, further comprising:
calculating a similarity value based on the comparison result of the frame image data of the plurality of frame images with the reference image data; and
displaying a first of the plurality of recognition result messages recommending updating of the reference image data in a fourth region of the screen when the similarity value indicates less similarity than a first predetermined value.

10. The method according to claim 9, further comprising:
changing the displayed one of the plurality of recognition result messages depending on the similarity value.

11. The method according to claim 10, wherein
a second of the plurality of recognition result messages suggesting the updating is displayed in the fourth region when the similarity value indicates more similarity than a second predetermined value and less similarity than the first predetermined value, and a third of the plurality of recognition result messages indicating that the updating is required is displayed in the fourth region when the similarity value indicates less similarity than the second predetermined value.

12. The method according to claim 9, wherein
a second of the plurality of recognition result messages indicating that the updating is unnecessary is displayed in the fourth region when the similarity value indicates more similarity than the first predetermined value.

* * * * *